(12) United States Patent
Watling

(10) Patent No.: US 7,967,088 B2
(45) Date of Patent: Jun. 28, 2011

(54) SNOWMOBILE SUSPENSION AND DRIVE TRAIN

(76) Inventor: Shawn Watling, Brampton (CA)

( * ) Notice: Subject to any disclaimer, the term of this patent is extended or adjusted under 35 U.S.C. 154(b) by 176 days.

(21) Appl. No.: 12/388,611

(22) Filed: Feb. 19, 2009

(65) Prior Publication Data

US 2010/0044135 A1 Feb. 25, 2010

Related U.S. Application Data

(63) Continuation-in-part of application No. 12/230,045, filed on Aug. 22, 2008, now Pat. No. 7,836,984.

(51) Int. Cl.
*B62D 55/104* (2006.01)
(52) U.S. Cl. ......... 180/9.64; 180/9.5; 180/190; 305/128
(58) Field of Classification Search .................. 180/184, 180/186, 190, 192, 193, 9.1, 9.25, 9.5, 9.54, 180/9.56, 9.64; 305/127, 128, 131, 133
See application file for complete search history.

(56) References Cited

U.S. PATENT DOCUMENTS

| | | | | |
|---|---|---|---|---|
| 3,446,303 A * | 5/1969 | Trapp | ............................. | 180/9.5 |
| 3,783,958 A * | 1/1974 | Canavan | ....................... | 180/184 |
| 3,966,004 A * | 6/1976 | Rose | ............................. | 180/193 |
| 5,860,486 A * | 1/1999 | Boivin et al. | .................. | 180/193 |
| 5,947,220 A * | 9/1999 | Oka et al. | ....................... | 180/193 |
| 6,234,263 B1 * | 5/2001 | Boivin et al. | .................. | 180/184 |
| 6,655,482 B2 * | 12/2003 | Simmons | ........................ | 180/9.1 |
| 6,962,222 B2 * | 11/2005 | Kirihata | ....................... | 180/9.46 |
| 7,182,165 B1 * | 2/2007 | Keinath et al. | ................ | 180/185 |
| 7,360,618 B2 * | 4/2008 | Hibbert et al. | ................ | 180/193 |
| 7,533,750 B2 * | 5/2009 | Simmons et al. | ............. | 180/193 |

* cited by examiner

*Primary Examiner* — Kevin Hurley

(57) ABSTRACT

A snowmobile suspension and drive train for supporting a snowmobile chassis and guiding an endless loop type track, the snowmobile suspension and drive train comprises an endless loop type snowmobile track supported by a suspension mechanism; wherein the track is being driven and guided at a rear track position with track drive sprockets and is supported and guided at a front track position with front idler wheels, and wherein an upper portion of the track is guided and supported at an intermediate position over top track wheels. The snowmobile suspension wherein the suspension mechanism includes a diagonally extending upper frame pivotally connected at a pivot point to a horizontally oriented lower frame in scissor relationship such that the suspension can move between a raised position and a lowered position.

18 Claims, 19 Drawing Sheets

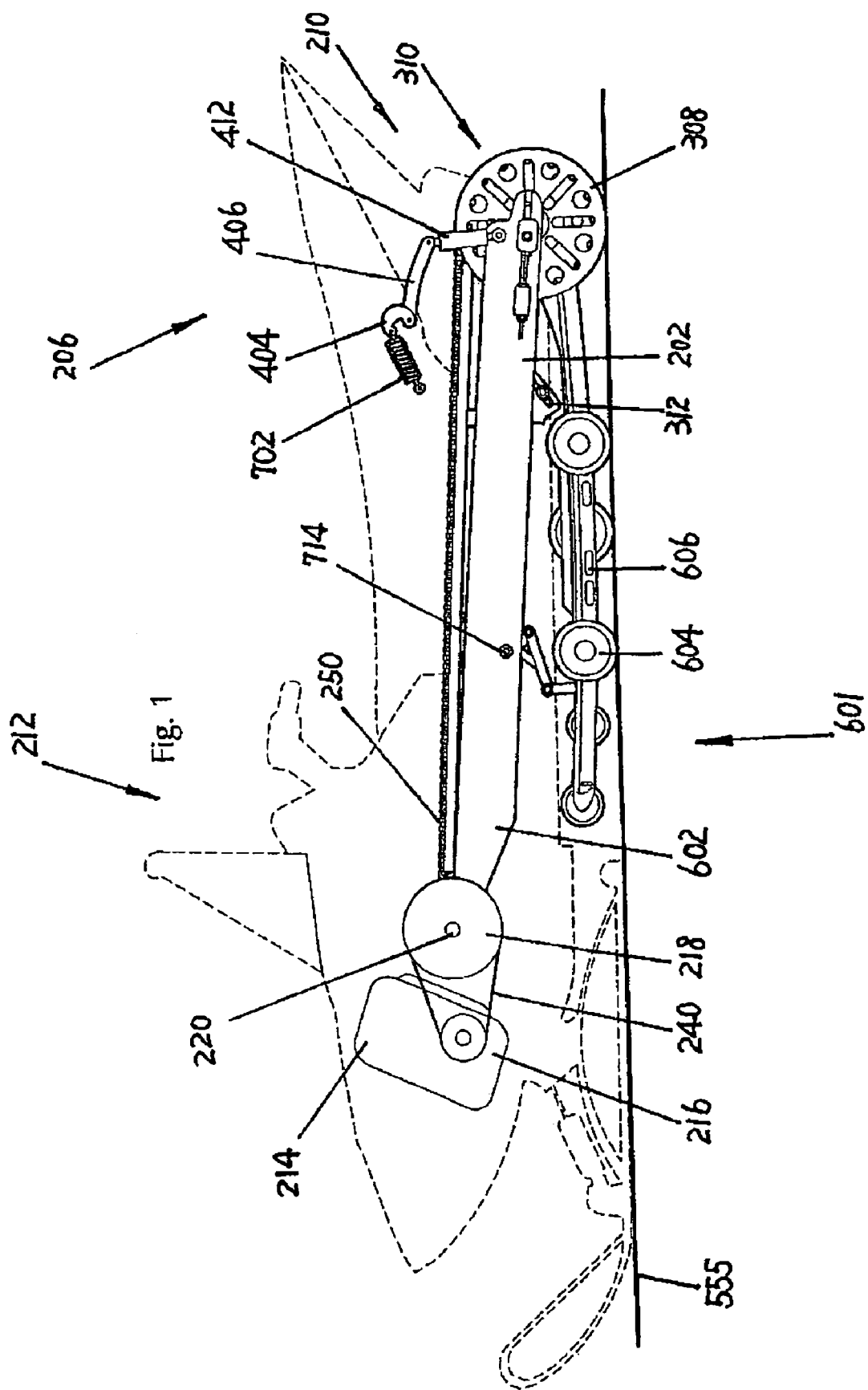

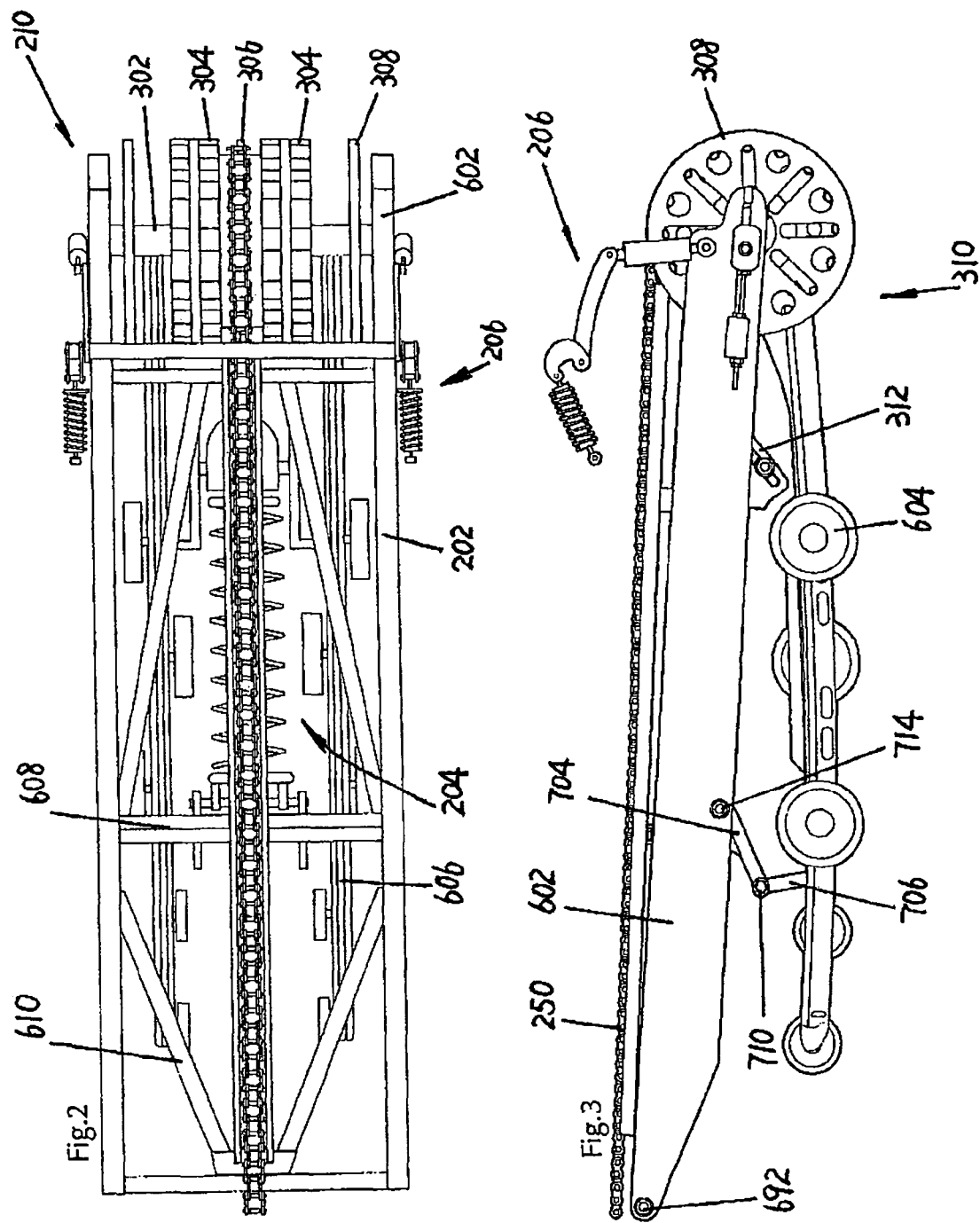

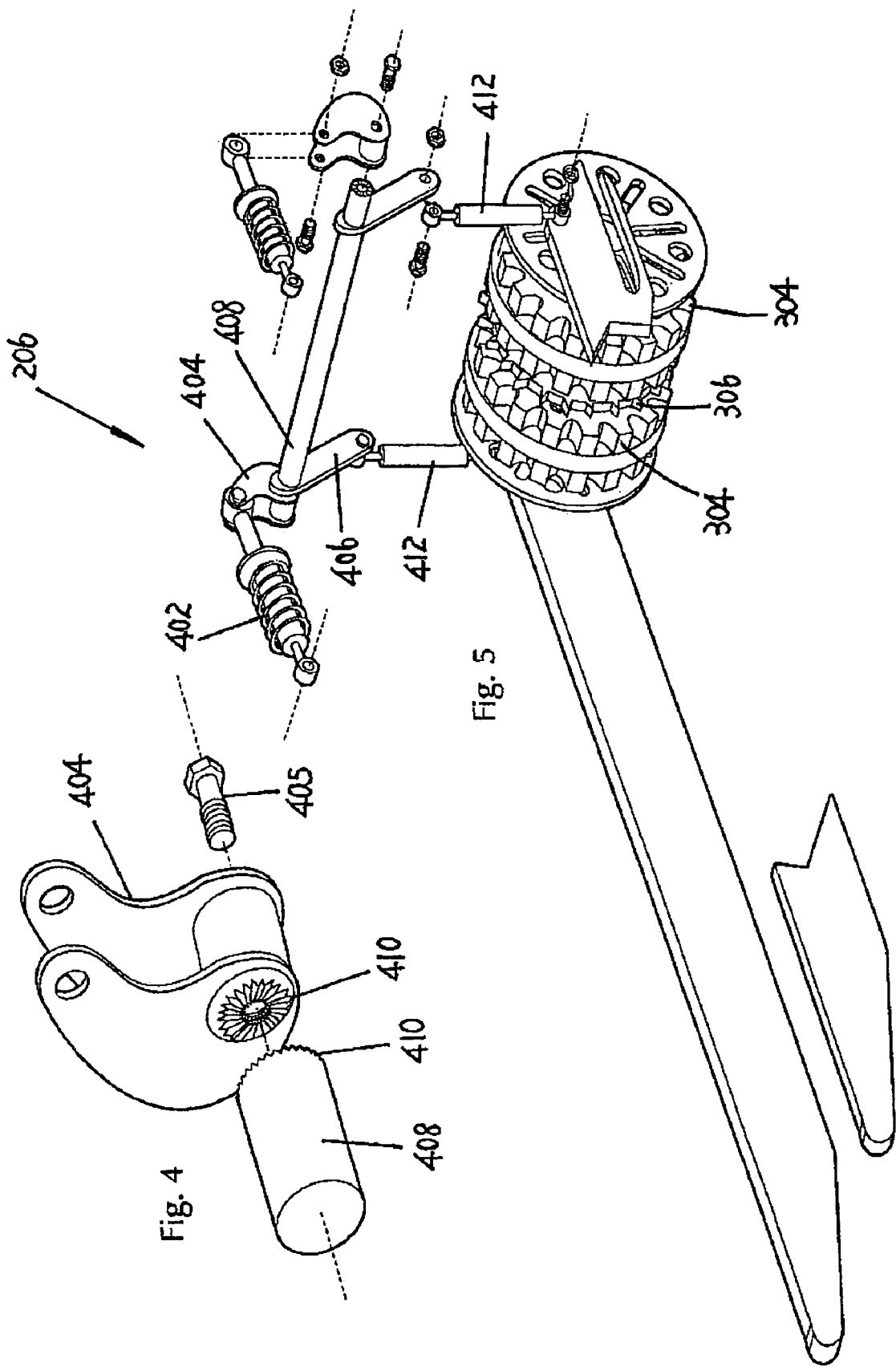

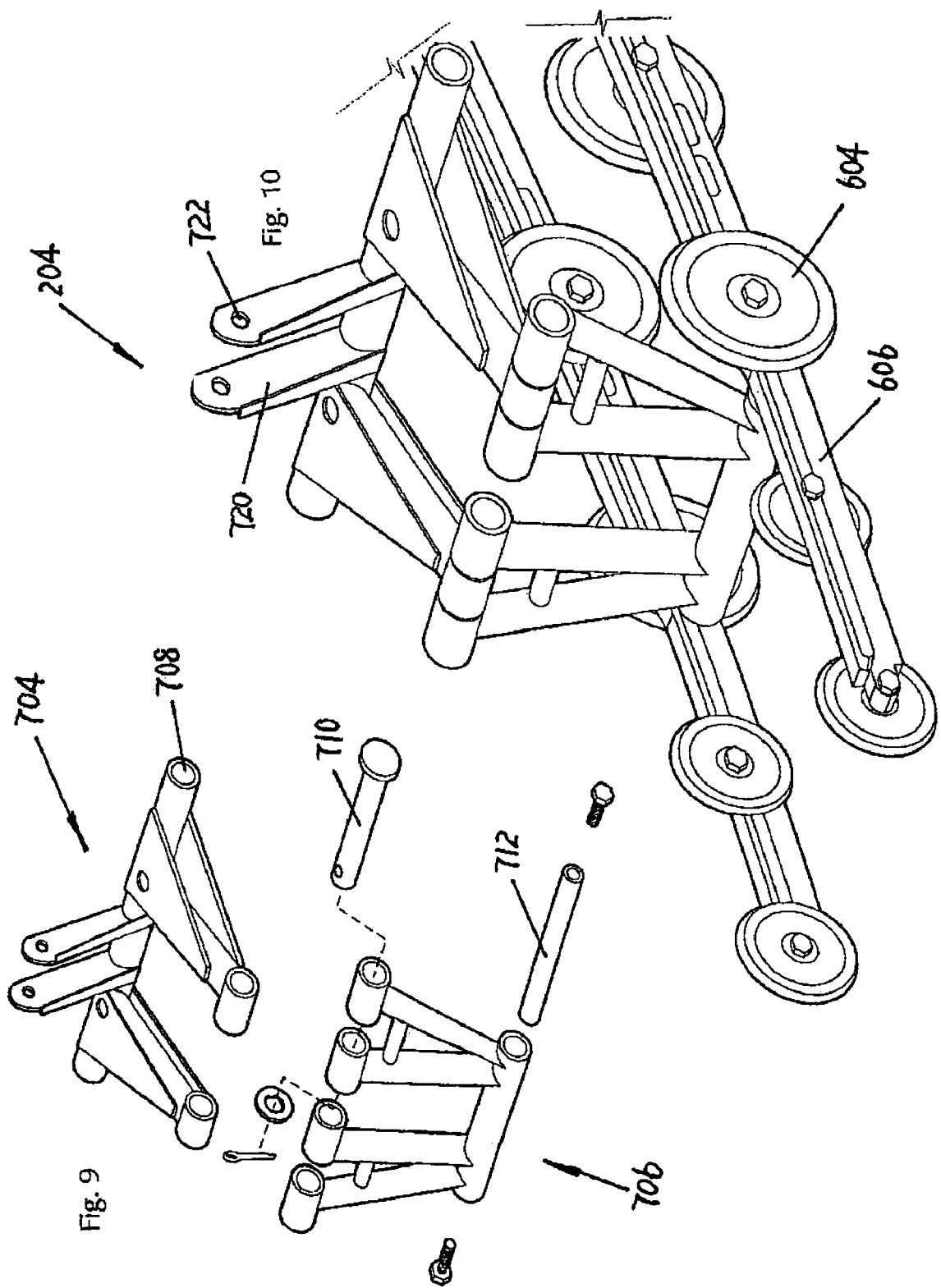

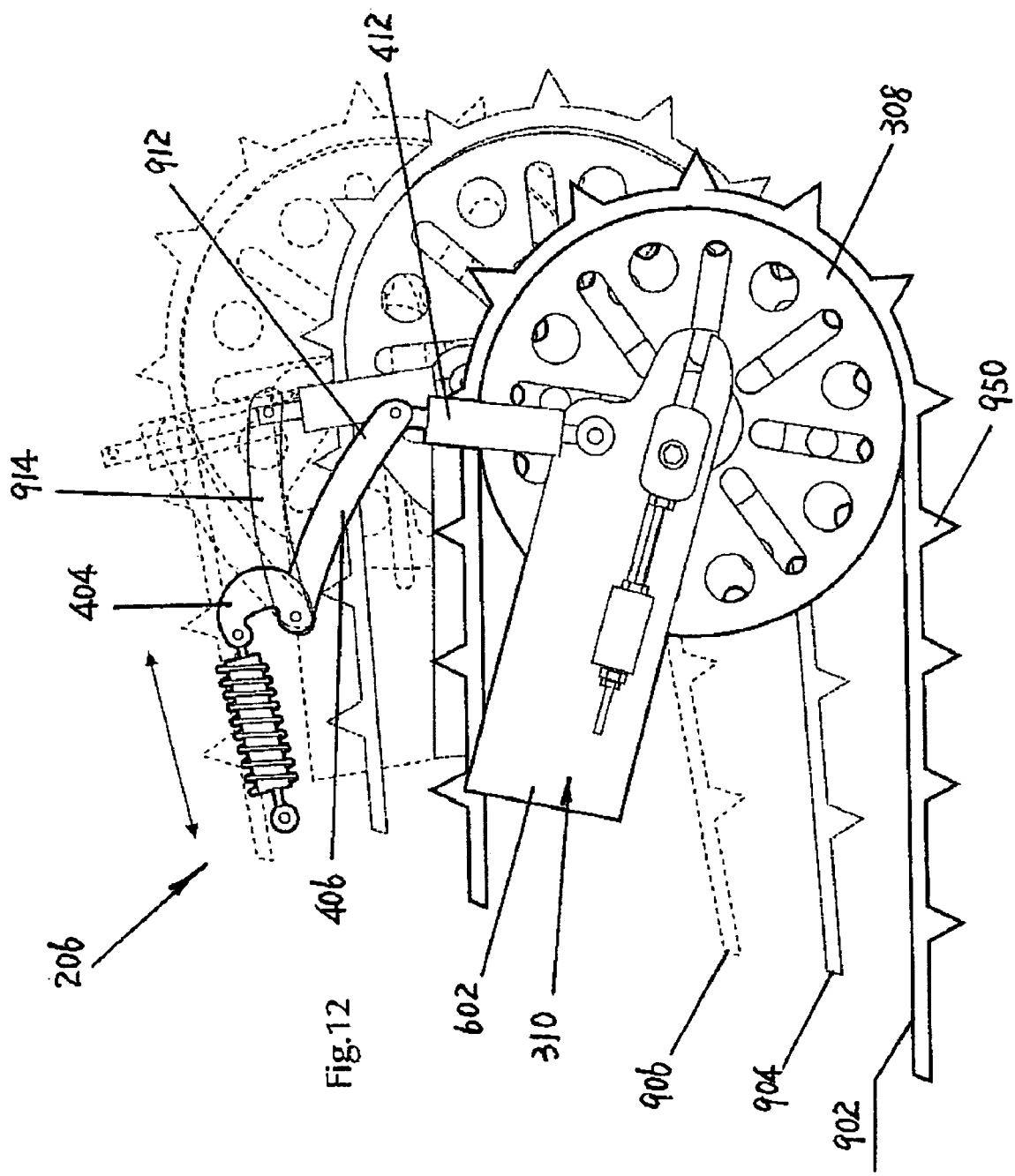

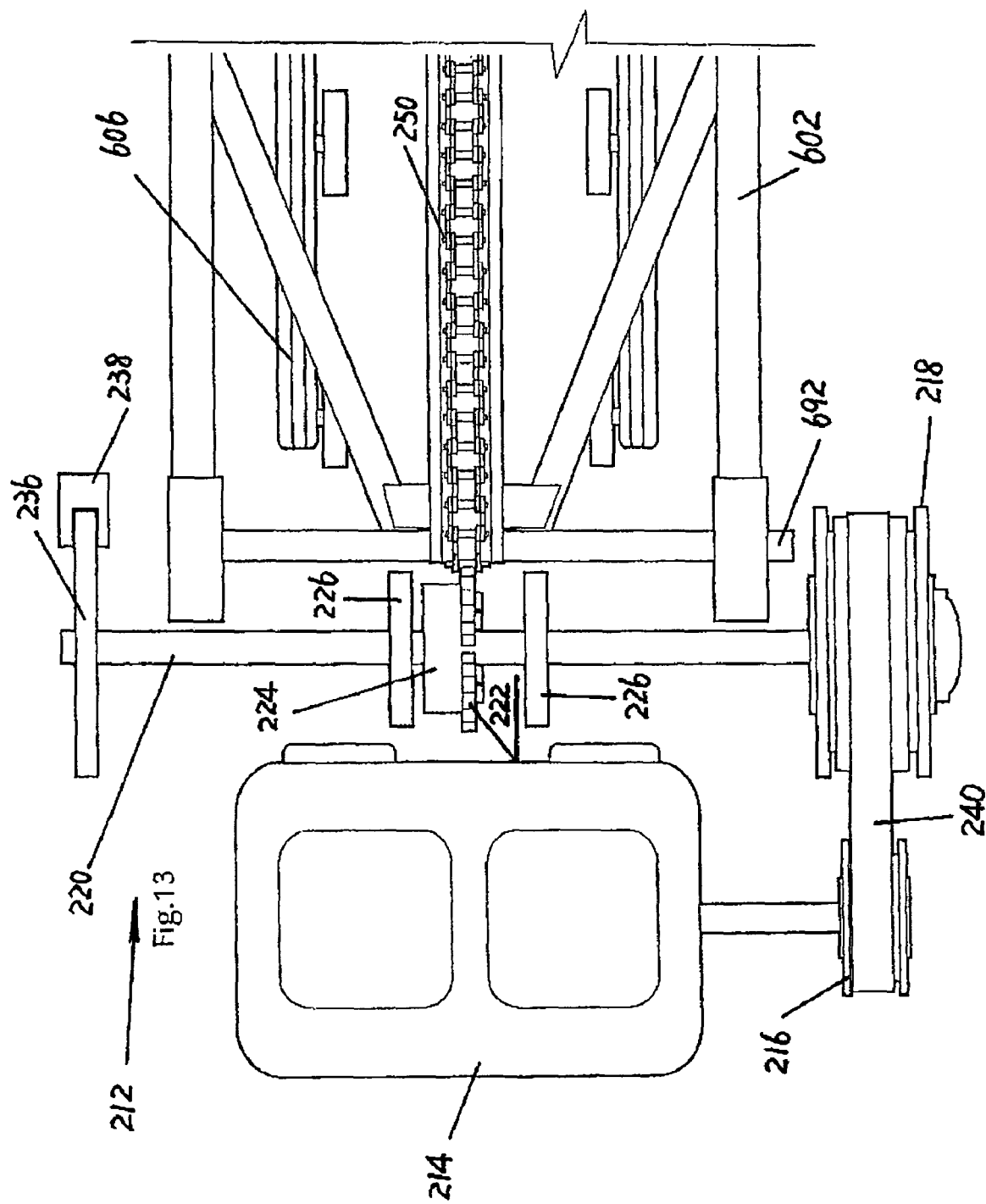

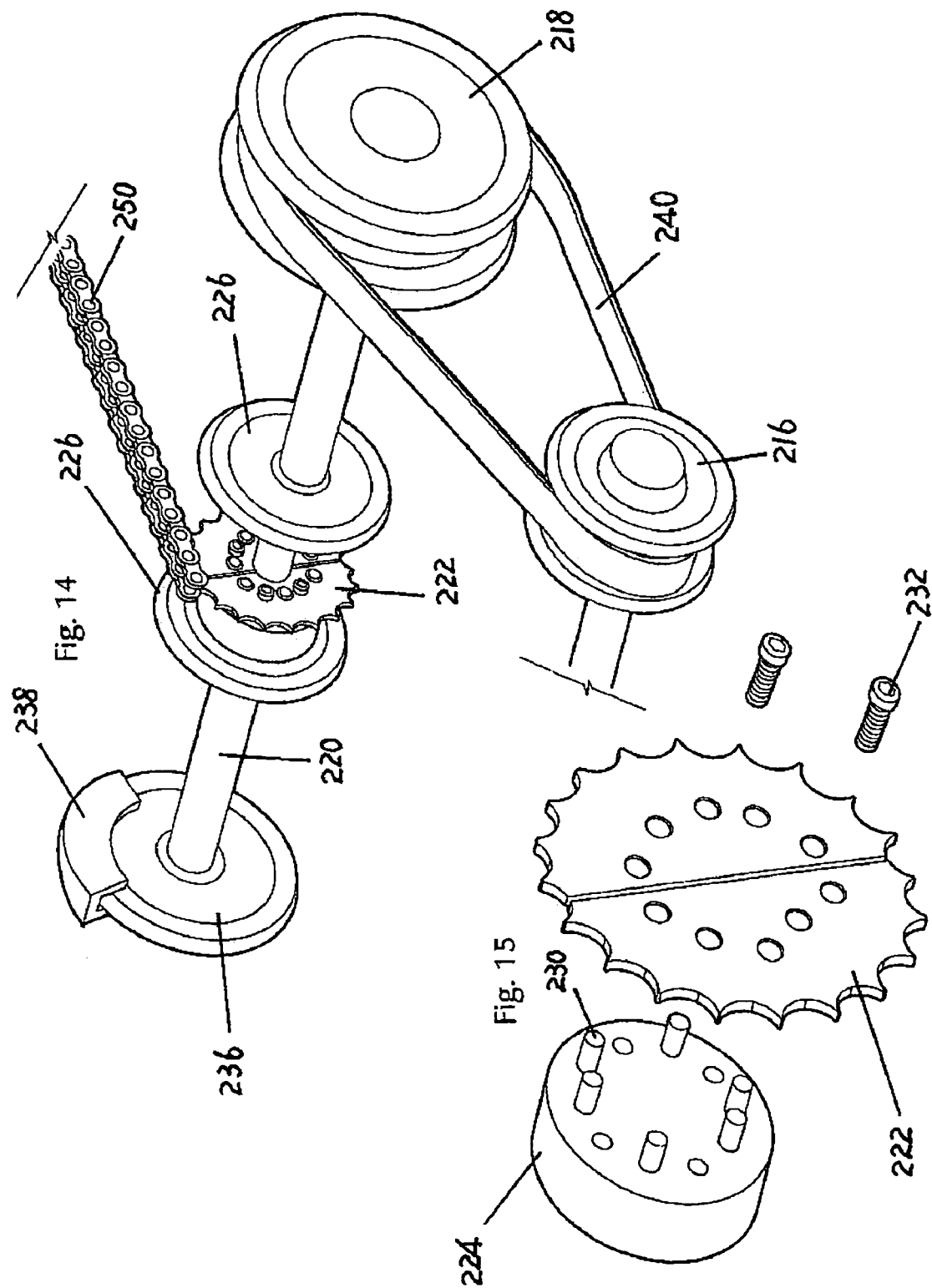

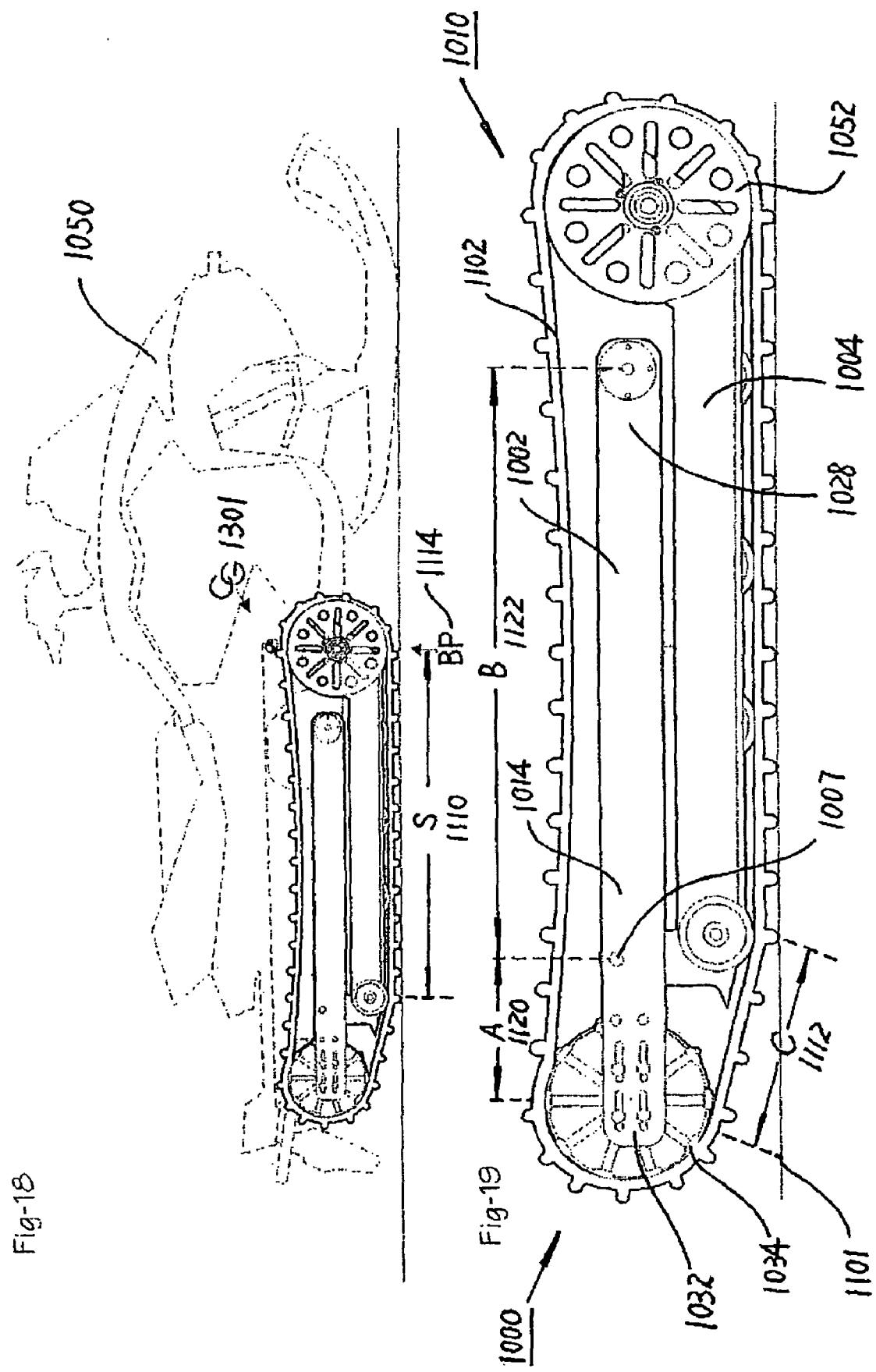

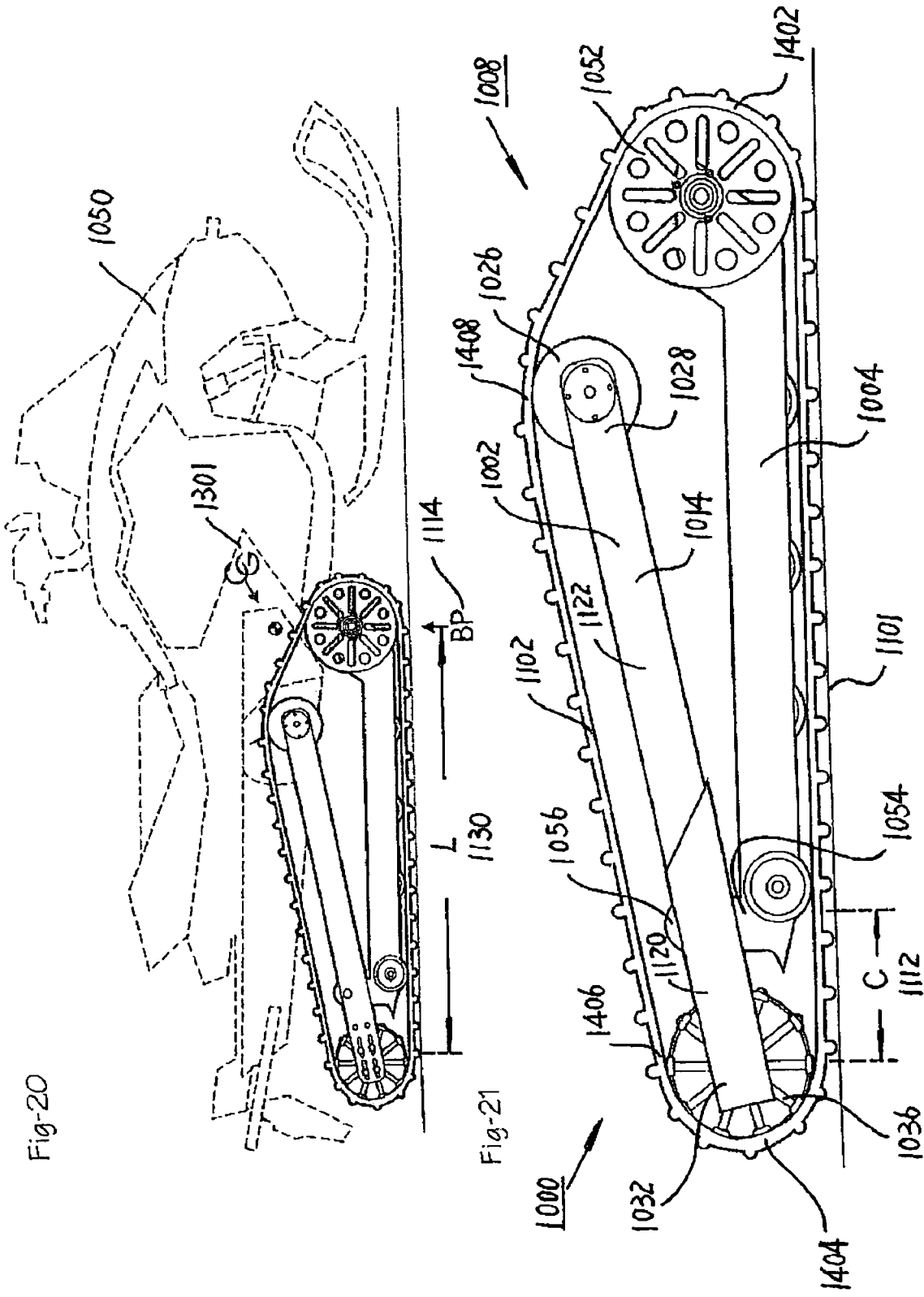

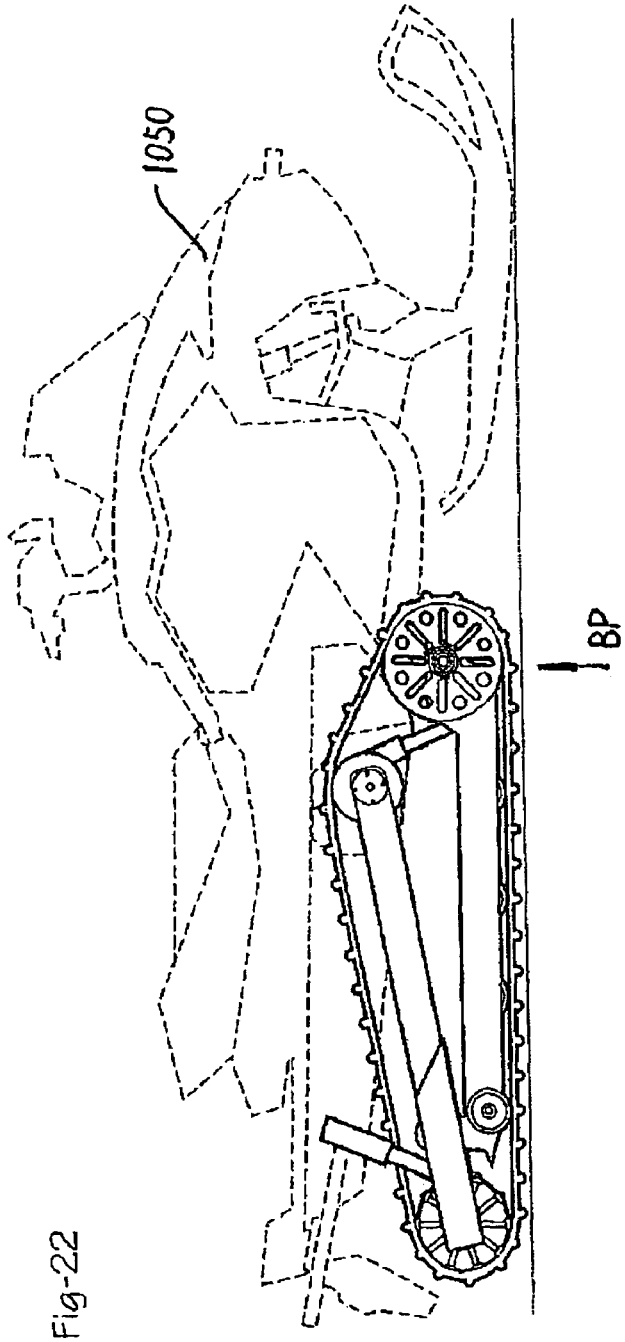
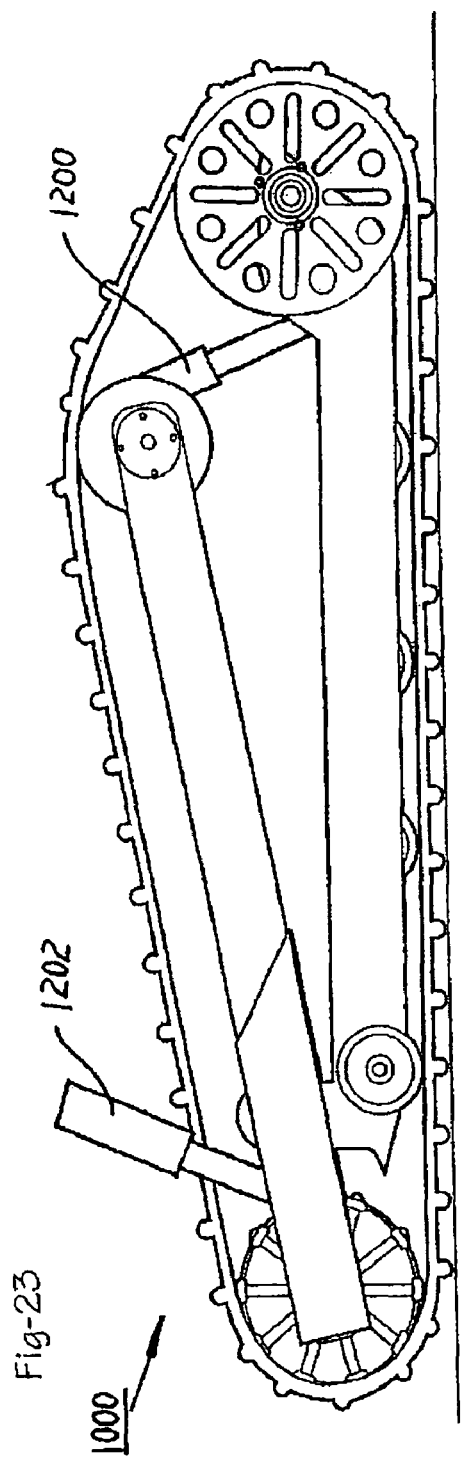
Fig-22
Fig-23

SNOWMOBILE SUSPENSION AND DRIVE TRAIN

FIELD OF THE INVENTION

The present invention is a continuation in part and claims priority from previously filed U.S. regular application filed on Aug. 22, 2008 application Ser. No. 12/230,045 inventor Shawn Watling under the title; Snowmobile Suspension and Drive Train. The present invention relates to a snowmobile suspension and drive train.

BACKGROUND OF THE INVENTION

Traditional snowmobile drive trains use a forward drive axle which is driven by a jack shaft which obtains power from the secondary clutch. The present invention eliminates the forward drive axle and instead uses a rear drive which includes a chain and sprocket drive.

SUMMARY OF THE INVENTION

A snowmobile suspension and drive train for supporting a snowmobile chassis and guiding an endless loop type track, the snowmobile suspension and drive train comprising an endless loop type snowmobile track supported by a suspension; wherein the track is being driven and guided at a rear track position with track rear drive sprockets and is supported and guided at a front track position with front idler wheels, wherein an upper portion of the track is guided and supported at an intermediate position over top track wheels.

Preferably wherein the front idler wheels positioned within 6 inches either side of the balance point.

Preferably wherein the front idler wheels positioned within 2 inches either side of the balance point.

Preferably wherein the front idler wheels positioned at the balance point.

Preferably wherein the suspension includes a upper frame pivotally connected at a pivot point to a horizontally oriented lower frame in scissor relationship such that the suspension movable between a raised position and a lowered position.

Preferably wherein in the lowered position the upper frame is oriented substantially parallel to the lower frame.

Preferably wherein in the raised position the upper frame is oriented such that it extends diagonally upwardly relative to the lower frame.

Preferably wherein in the raised position a reaction force vector passing through the pivot point and parallel to the frame rail will intersect with the center of gravity.

Preferably wherein in the raised position a reaction force vector passing through the pivot point and parallel to the frame rail will pass above the center of gravity.

Preferably 5 wherein the pivot point dividing upper frame into a rear arm portion on one side of the pivot point and a front arm portion on the other side of the pivot point.

Preferably wherein in the lowered position rear arm portion raises the drive sprockets off of the ground creating a track lifted portion being the part of the track no longer contacting the ground thereby creating a track short contact length being the portion contacting the ground.

Preferably wherein in the raised position rear arm portion lowers rear drive sprockets toward the ground eliminating a track lifted portion thereby creating a track long contact length being the portion contacting the ground.

Preferably wherein the lower frame including left and right frame members having mounted thereon track wheels for supporting the track rollably thereon.

Preferably wherein the pivot point is spaced upwardly from the frame members and located in pivot flange projecting upwardly from a rear end of each frame member thereby creating L shaped left and right frame members.

Preferably wherein the suspension is fastened to the chassis with front adjustable shocks and rear adjustable shocks such that the front track portion and the rear track portion can be adjusted up and down independently of each other.

BRIEF DESCRIPTION OF THE DRAWINGS

The invention will now be described by way of example only with reference to the following drawings in which:

FIG. 1 is a side schematic partial cut away view of the present invention a snowmobile suspension and drive train.

FIG. 2 is a top plan view of the snowmobile suspension and drive train.

FIG. 3 is a side elevational view of the snowmobile suspension and drive train.

FIG. 4 is a schematic partial assembly view of a portion of the rear shock assembly and adjusting mechanism.

FIG. 5 is a schematic partial cut away view of the rear shock assembly.

FIG. 9 is a schematic assembly of a portion of the front shock assembly.

FIG. 10 is an assembled partial schematic perspective view of the front shock assembly together with the slide rails.

FIG. 12 is a partial side schematic view of the rack and rear idle wheels together with the rear shock assembly shown in a first position in dark lines and a second position in light dashed lines and in a third position an even lighter dashed lines.

FIG. 13 is a top schematic plan view of a portion of the snowmobile suspension and drive train together with the engine and primary and secondary clutch.

FIG. 14 is a schematic partial cut away view of the driven jack shaft together with various component mounted thereon including the brake rotor, the front idler wheels, the front drive split sprocket and the secondary clutch.

FIG. 15 is an exploded assembly view of the mounting hub, the front drive split sprocket and the pins and bolts for assembly of the components.

FIG. 18 is a schematic side elevational view of the snowmobile suspension and drive train shown in solid lines together with a snowmobile chassis shown in dashed lines.

FIG. 19 is an enlarged side elevational schematic view of the snowmobile suspension and drive train shown in FIG. 18.

FIG. 20 is a schematic side elevational view of the snowmobile suspension and drive train deployed in a chassis of a snowmobile shown in dashed lines.

FIG. 21 is a side elevational schematic side view of the snowmobile suspension and drive train shown in FIG. 16 in the raised position.

FIG. 22 is a schematic side elevational plan view of the snowmobile suspension and drive train in solid lines deployed onto a snowmobile chassis shown in dashed lines.

FIG. 23 is an expanded side elevational schematic view of the snowmobile suspension and drive train together with front and rear adjustable shocks.

DETAILED DESCRIPTION OF THE PREFERRED EMBODIMENT

Figure 6:
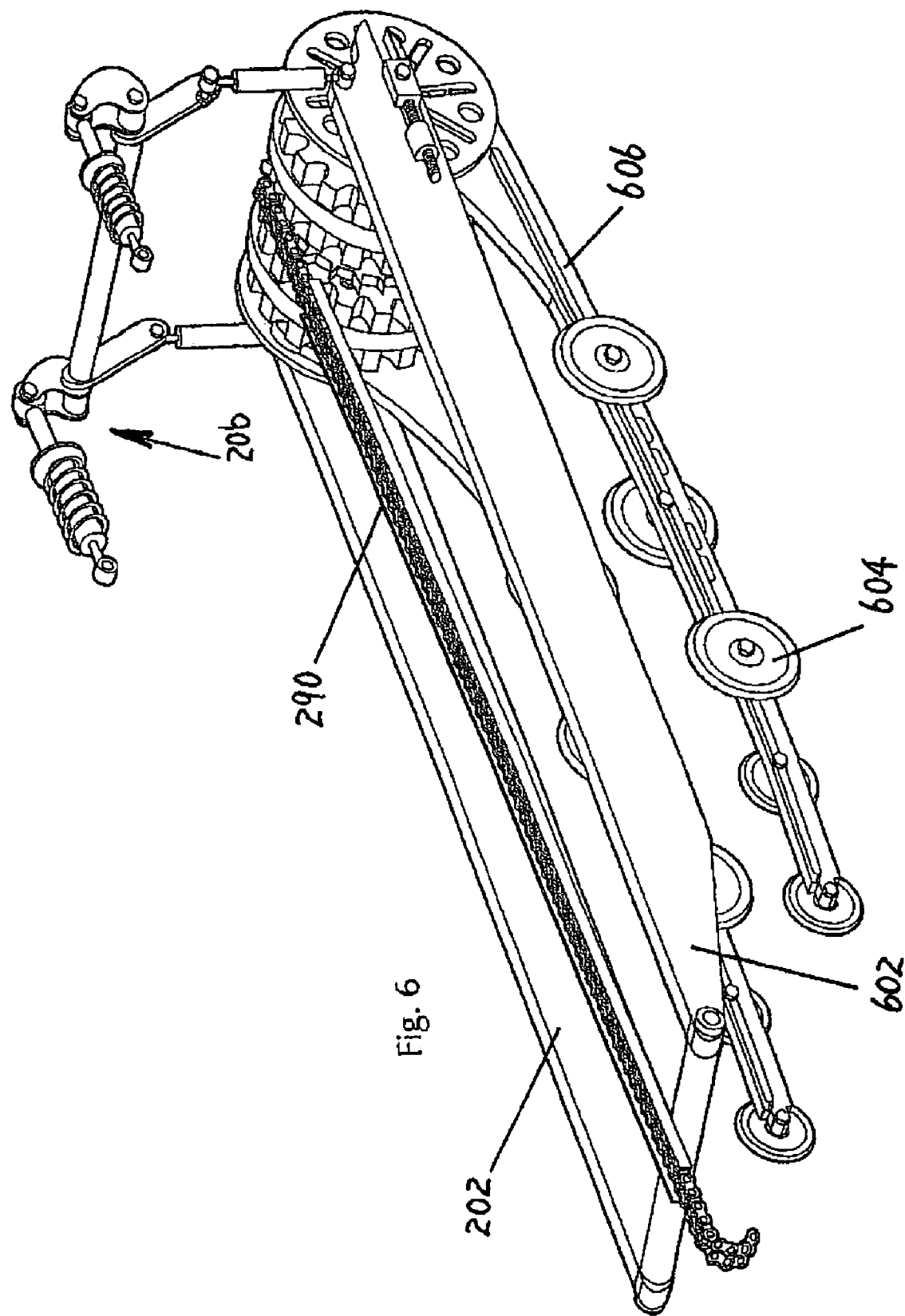
FIG. 6 is a top schematic partial cut away view of the snowmobile suspension and drive train.
Figures 7, 8:
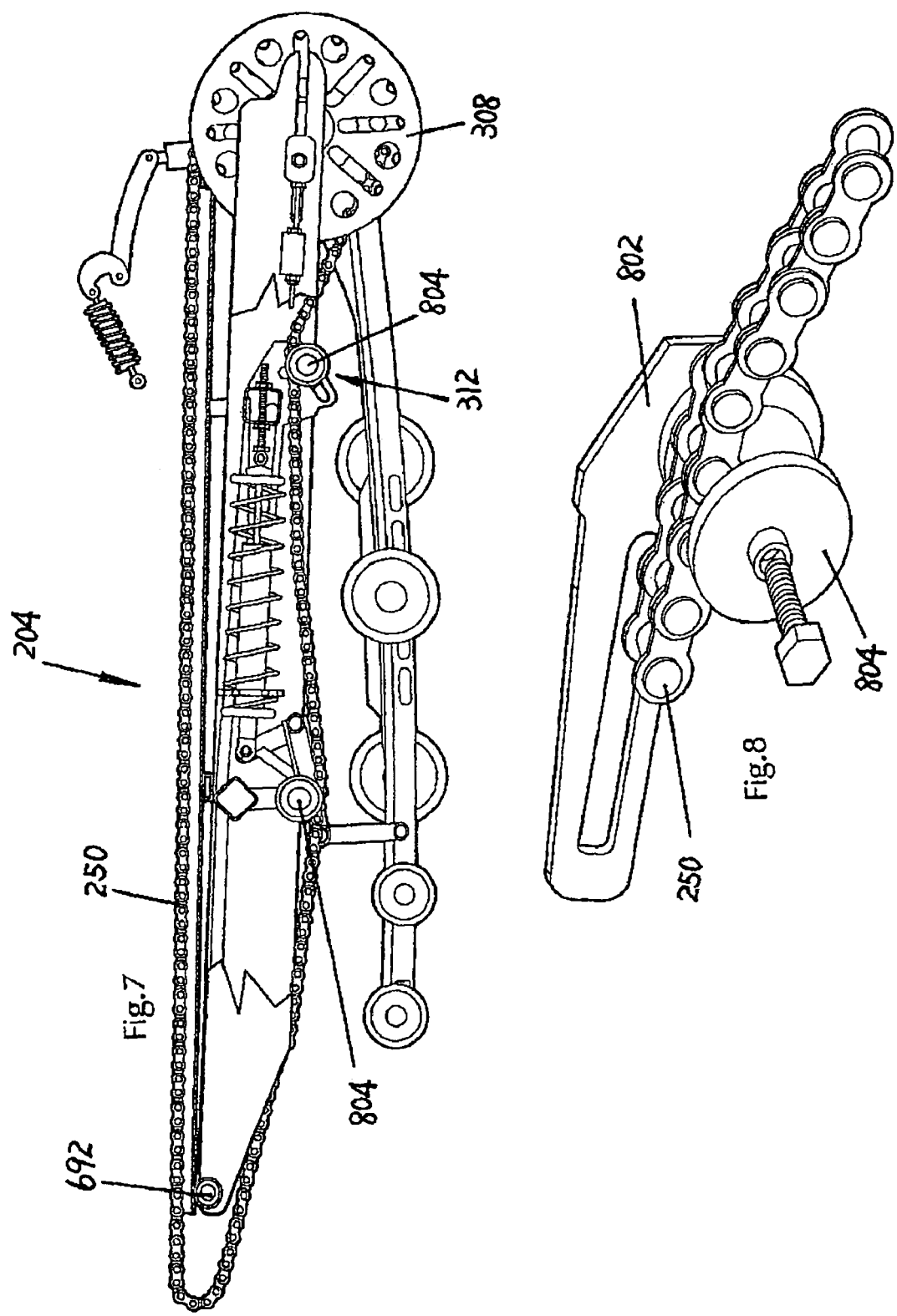
FIG. 7 is a partial schematic cut away side plan view of the snowmobile suspension and drive train.
FIG. 8 is a schematic partial view of components of the chain tensioning assembly.

The attached figures show a snowmobile suspension and drive train which includes the following major components, namely ladder bar frame 202, front shock assembly 204, rear shock assembly 206, drive chain 250, rear drive assembly 210, front drive assembly 212, engine 214, primary clutch 216 and driven secondary clutch 218.

Referring now to FIGS. 13, 14 and 15 front drive assembly 212 includes a live driven jack shaft 220, a front drive split sprocket 222, a mounting hub 224 and idler wheels 226.

Front drive split sprocket 222 is mounted onto mounting hub 224 using pins 230 and bolts 232. Mounting hub 224 is mounted onto driven jack shaft 220 in traditional manners including splines etc., for rigidly mounting, mounting hub 224 onto driven shaft 220.

Driven shaft 220 also includes brake rotor 236 and brake calliper 238 mounted on one end of the driven shaft 220 and the secondary clutch 218 mounted on the other end of driven shaft 220.

Engine 214 drives primary clutch 216 which in turn drives secondary clutch 218 via drive belt 240.

Front drive split sprocket 222 drives drive chain 250.

Referring now to FIGS. 2, 3, 4 and 5, rear drive assembly 210 includes fixed rear axle 302, track sprockets 304, driven chain sprocket 306, rear idler wheels 308, track tension assembly 310, rear shock assembly 206 and chain tensioning assembly 312.

Rear shock assembly 206 includes coil over rear shock 402, upper pivot arm 404, lower pivot arm 406, rear pivot shaft 408, sprag or splined faces 410 and connecting link 412.

Ladder bar frame 202 includes outer rails 602, cross member 608, stiffening member 610, and has attached thereto idler track wheels 604 and slide rails 606.

Figure 11:
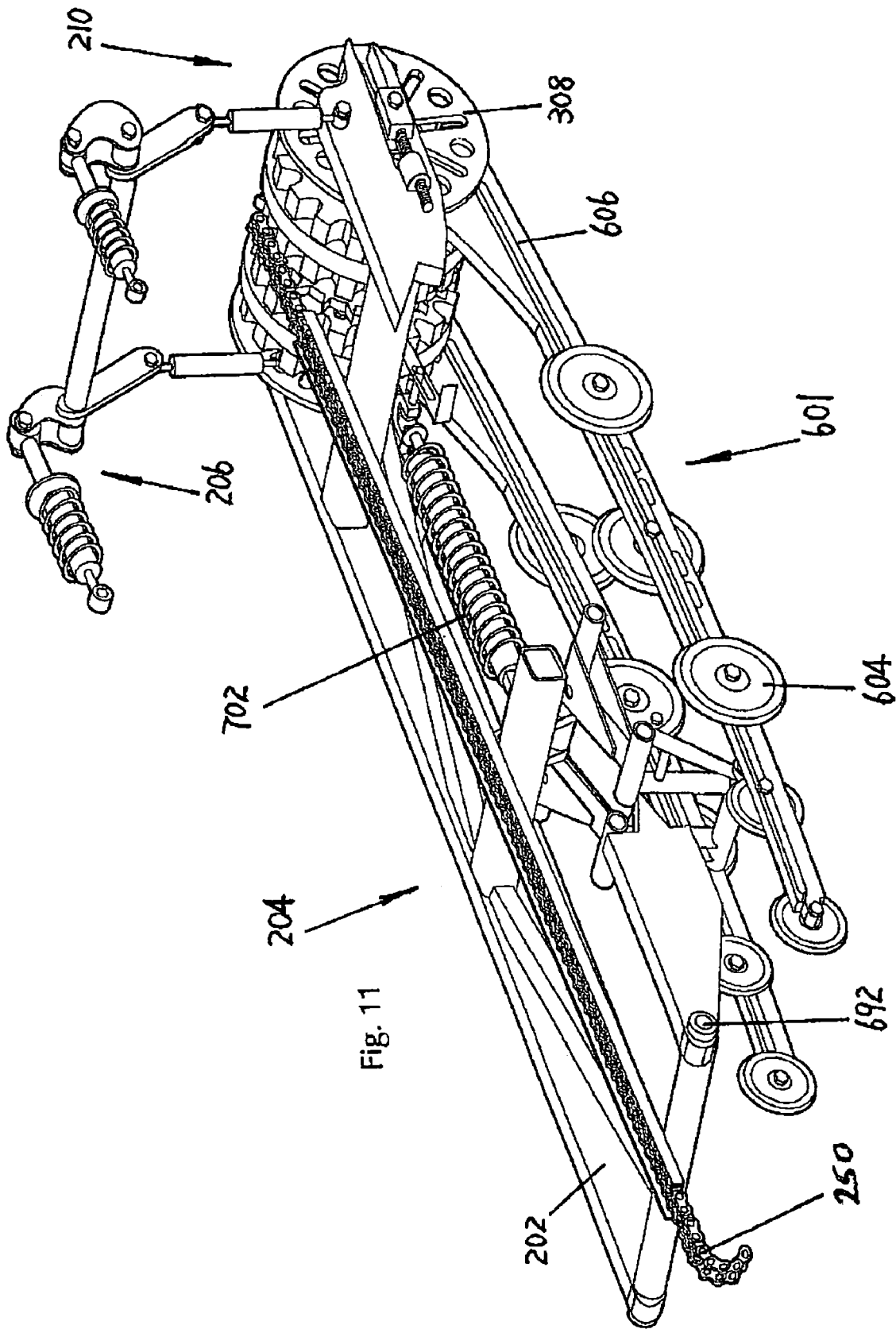
FIG. 11 is a top plan schematic view of the rear shock assembly and the front shock assembly shown mounted on the ladder bar frame.

Front shock assembly 204 best shown in FIGS. 9, 10 and 11, includes an adjustable coil over shock 702, a front pivot arm 704, a slide rail connecting link 706, aperture for pivot arm shaft 708, connecting pins 710, connecting link shaft 712 and pivot arm shaft 714. Front pivot arm 704 also includes shock flanges 720, and shock mounting holes 722.

Chain tension assembly 312 includes the drive chain 250, a slotted adjustment bracket 802 and a chain idler wheel 804.

Ladder bar frame 202 is connected to the snowmobile chassis at front ladder bar pivot shaft 692.

Referring now to FIG. 12 showing rear shock assembly 206 together with the track in various positions by adjusting the rear shock assembly 206 namely by setting the spline faces 410 relative to each other by clamping upper pivot arm against rear pivot shaft 408. In this manner one can align upper pivot arm 404 at relative angles to lower pivot arm 406. So for example, one can obtain a track first position 902 by engaging sprag or spline faces 410 in such a manner that lower pivot arm takes on first position 912. One can obtain track second position 904 by adjusting lower pivot arm into second position 914 and one can obtain a track third position 906 as shown in FIG. 12. Therefore, the track 950 can be adjusted to various heights relative to the chassis of the snowmobile by adjusting the sprag or spline faces 410 of the rear pivot shaft 408 relative to the upper pivot arm 404 with bolt 405. In this manner, one can adjust the ride height to suit individual riding conditions and increase or decrease the suspension travel.

Snowmobile Drive Train
In Use

The presently described rive train includes an engine 214 which drives a primary clutch 216 which is connected to a secondary clutch 218 via a drive belt 240. Secondary clutch 218 drives a driven jack shaft 220 which is a live shaft which includes front drive split sprocket 222 mounted onto a mounting hub 224 connected to driven jack shaft 220. Driven jack shaft 220 also includes a brake rotor 236 and a brake calliper 238 mounted on one distal end thereof. In addition, there are two front idler wheels 226 which guide track 950 over top of and around front drive assembly 212. Front drive split sprocket 222 drives a drive chain 250 which in turn is connected to driven chain sprocket 306 which is mounted on fixed rear axle 302.

Fixed rear axle 302 includes two sets of track sprockets 304 which are mounted on either side of driven chain sprocket 306. In addition, rear idler wheels 308 guide track 950 around rear drive assembly 210. Drive chain 250 in addition passes overtop of two chain idler wheels 804, the first positioned closer to the front of the snowmobile and the second chain idler wheel 804 is part of a chain tensioning assembly 312. Chain tensioning assembly 312 includes a slotted adjustment bracket 802 along which chain idler wheel 804 can be mounted at various positions in order to adjust chain tension. A chain guard 290 is also mounted on the upper part of the drive assembly to ensure that chain 250 does not make contact with any of the parts of the ladder bar frame 202. This drive system results in reduced moving components and increased flexibility in that any number of the sprocket combinations can be used to determine the final drive ratio and to optimize the drive train for any particular driving condition. In addition, rather than the front portion of the track being driven, in this case the rear portion of the track is driven, resulting in completely different driving characteristics of the snowmobile due to the tensioning on track 950 and the torque imposed upon the snowmobile during hard acceleration.

This drive setup allows for a very stiff ladder bar frame construction having cross member 608 and stiffening member 610 which pivot about one point near the front of the snowmobile namely, about front ladder bar pivot shaft 692.

Snowmobile Suspension
In Use

The snowmobile suspension includes a front shock assembly 204 and two rear shock assemblies 206. Front shock assembly 204 includes an adjustable coil over shock 702 which is attached at one end to ladder bar frame 202 and at the other end to shock mounting hole 722 in front pivot arm 704. In turn, slide rail connecting link 706 is hinge ably connected to front pivot arm 704 with a connecting pin 710. Slide rail connecting link 706 is attached to slide rail 606 with a connecting link shaft 712. Slide rail 606 is very much the same as the slide rail assemblies found on existing snowmobiles having a number of idler track wheels 604 for guiding the track along the bottom of the snowmobile. Rear shock assembly 206 includes rear pivot shaft 408. On each distal end of rear pivot shaft 408, a coil over rear shock 402 is mounted to an upper pivot arm 404 which is connected to rear pivot shaft 408 with a sprag or spline faces 410 found on both the upper pivot arm 404 and the rear pivot shaft 408. The spline faces are meshed together using a bolt 405 for rigidly connecting upper pivot arm 404 to rear pivot shaft 408. In addition, there is a lower pivot arm 406 rigidly attached to rear pivot shaft 408 which in turn is connected to a connecting link 412 which is connected at one to the ladder bar frame 202 and at the other end to lower pivot arm 406. As best shown in FIG. 12 via adjusting the position of the sprag or spline faces 410, one can select any number of angular positions of lower pivot arm 406 in relationship to upper pivot arm 404. FIG. 12 shows three such possibilities namely track first position 902, track second position 904 and track third position 906. By adjusting the angular relationship between the upper pivot arm 404 and the lower pivot arm 406 using the sprag or spline faces 410, one can have a high riding position and or a low riding position and/or select large suspension travel or smaller suspension travel depending upon the position of the pivot arms.

The suspension will also include a track tension assembly 310 which is an assembly well known in the present art. In order to adjust the tension on track 950, first of all the chain tensioning assembly 312 would be backed off completely in order to remove any tension on drive chain 250. Once drive chain 250 is slack, one can then adjust the track tensioning assembly 310 in order to obtain the necessary tension on track 950. Thereafter, the chain tensioning assembly 312 would be adjusted to obtain the necessary tension on drive chain 250.

Description of Alternate Embodiment of a Snowmobile Suspension and Drive Train

Figure 16:
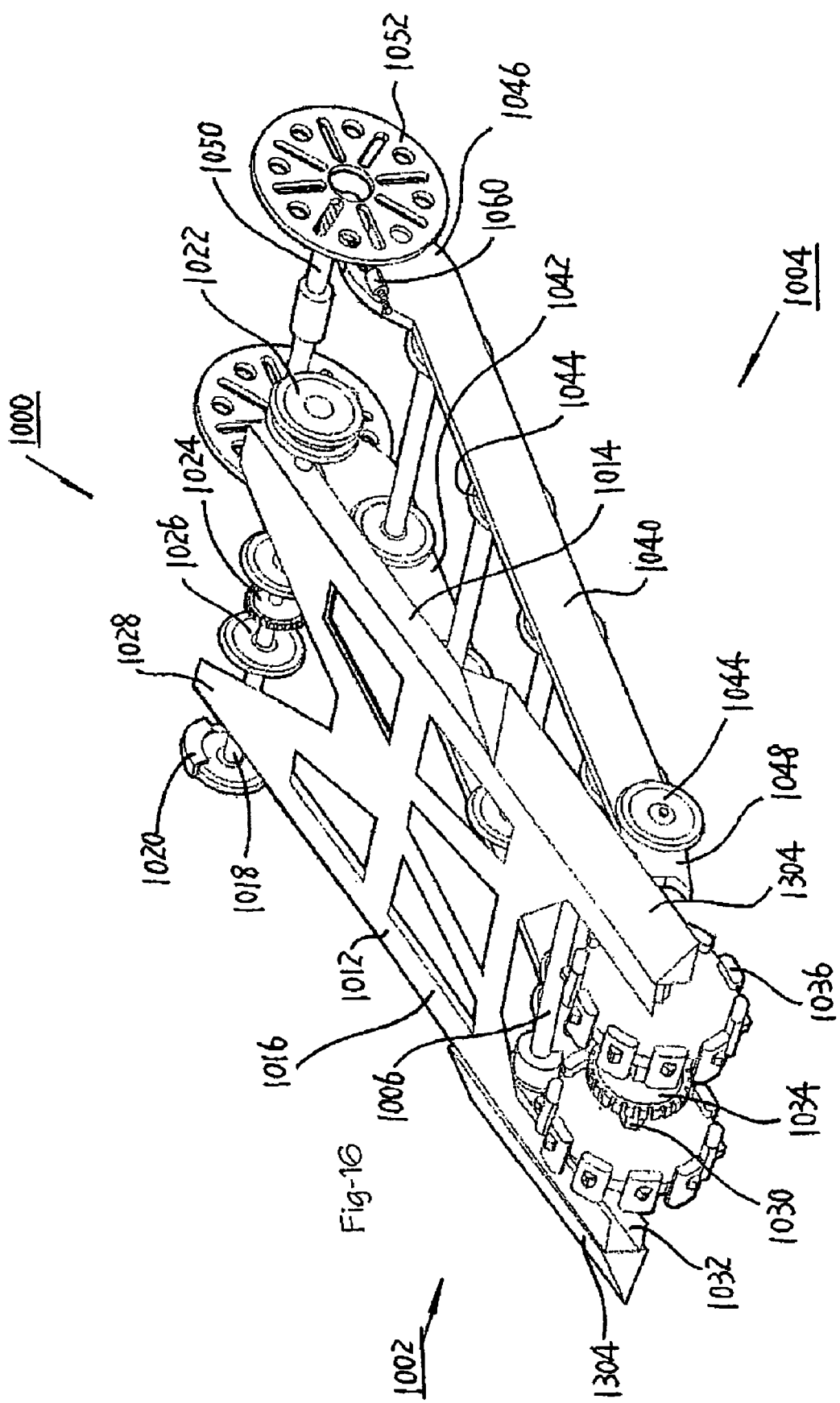
FIG. 16 is a rear perspective assembled schematic view of an alternate embodiment of a snowmobile suspension and drive train.

An alternate embodiment of a snowmobile suspension and drive train is shown generally as 1000 in FIG. 16 and following:

Snowmobile suspension and drive train 1000 includes the following major components namely, upper frame 1002 pivotally attached and connected to lower frame 1004 at a pivot point 1007 with a pivot shaft 1006. The track 1102 is an endless loop type snowmobile track supported by the suspension wherein track 1102 is being driven and guided at a rear track position 1404 with track drive sprockets 1036 and is supported and guided at a front track position 1402 with front idler wheels 1052 and the upper portion 1406 of track 1102 is guided at an intermediate position 1408 overtop track wheels 1026. Note that track 1102 is driven at the rear track position 1404 which is where the track just breaks contact with ground 1101. With suspension 1000 in raised position 1008 track 1102 breaks contact with the ground under track drive sprockets. With suspension 1000 in lowered position 1010 track 1102 breaks contact with the ground under the rearmost track wheel 1044. Track 1102 just begins to make contact with ground 1102 at front track position 1402 under front idler wheel 1052. Upper portion 1406 of track 1102 does not make contact with ground 1101.

The suspension includes a diagonally extending upper frame 1002 pivotally connected to a horizontally oriented lower frame 1004 in scissor relationship pivoting at pivot point 1007. Upper frame 1002 can be pivoted in scissor like fashion relative to lower frame 1004 between a raised position 1008 shown in FIG. 21 and a lowered position 1010 shown in FIG. 19. In the lowered position the upper frame 1002 is oriented substantially parallel to the lower frame 1004 meaning the frames are within plus or minus 10 degrees being the angle subtended by the two frames. In the raised position the upper frame is oriented such that it extends diagonally upwardly relative to the pivot point as shown in FIG. 21.

Upper frame 1002 is preferably designed and fabricated in the style of a ladder bar 1012 having a right frame rail 1014 and a left frame rail 1016 connected together with bars.

Upper frame 1002 also includes the following components namely, front driven shaft 1018 having attached thereon a brake system 1020, a motor driven pulley 1022 receiving power from the motor via a motor drive belt 1074. Front driven shaft 1018 further includes front sprocket 1024 and top track wheels 1026. Front driven shaft 1018 is located at the top end 1028 of upper frame 1002 and rear drive shaft 1030 is located at bottom end 1032 of upper frame 1002. Rear drive shaft 1030 has mounted thereon rear drive sprocket 1034 for receiving a chain thereon and track drive sprockets 136 which transmit power to the snowmobile track 1102.

Lower frame 1004 includes a right frame member 1040, a left frame member 1042, and track wheels 1044.

Each of the frame members has an idler end 1046 and a rear end 1048. At idler end 1046, idler shaft 1050 is mounted having front idler wheels 1052 mounted thereon. Front idler wheels guide the track 1102 around the snowmobile suspension and drive train 1000.

Lower frame 1004 at rear end 1048 includes a pivot flange 1054 which as shown in the Figures is an L-shaped flange generally extending perpendicular to the frame members 1042 and 1040. Proximate a top end 1056 of pivot flange 1054 is mounted pivot shaft 1006 there through thereby pivotally connecting upper frame 1002 to lower frame 1004 at pivot point 1007.

Included at the idler end 1046 is a track tensioning mechanism 1060 for obtaining the necessary track tension onto the track and also for facilitating removal and mounting of the track 1102 onto the snowmobile suspension and drive train components 1000.

Figure 17:
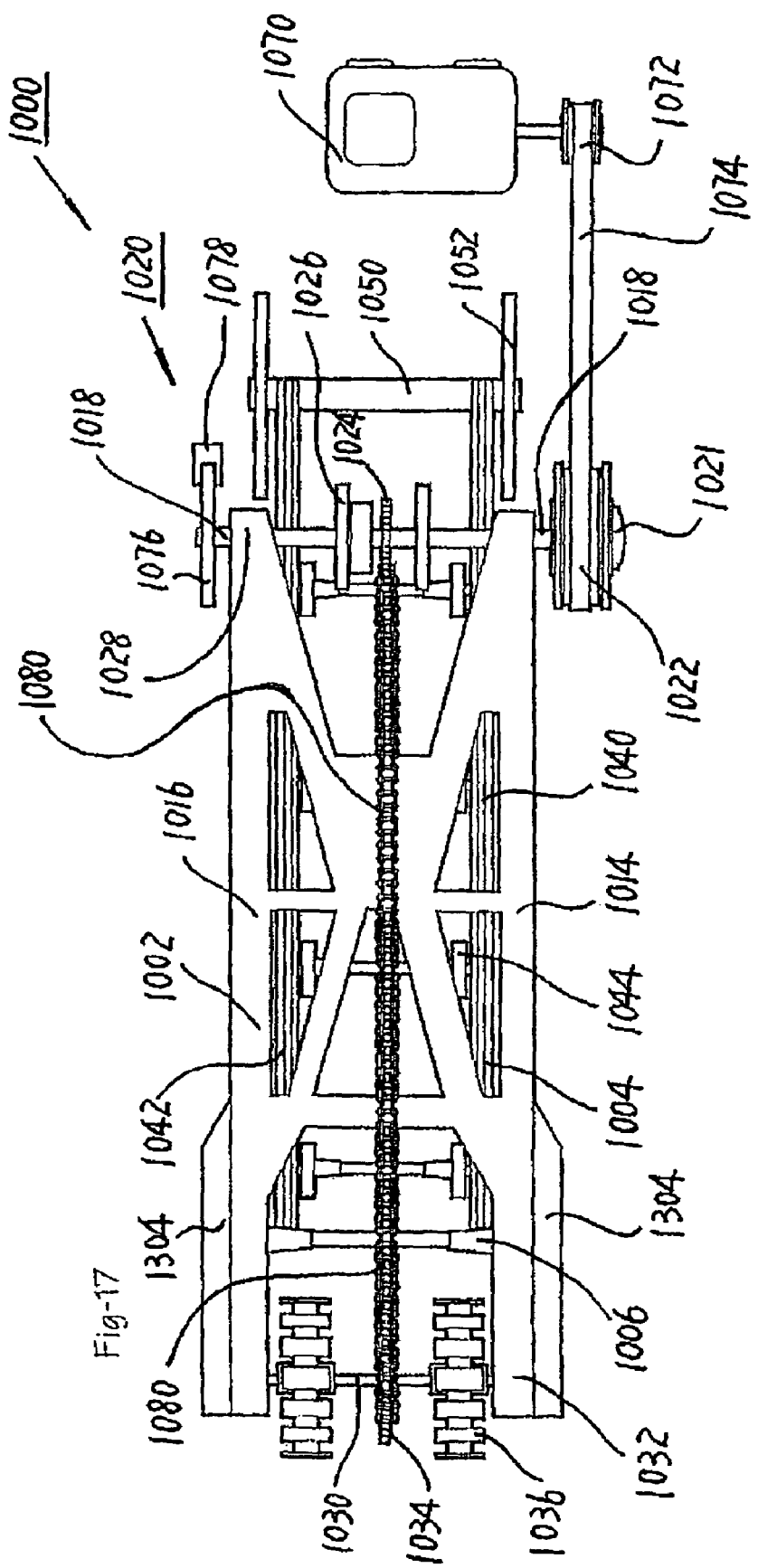
FIG. 17 is a top plan view of the snowmobile suspension and drive train shown in FIG. 16.
Figure 24:
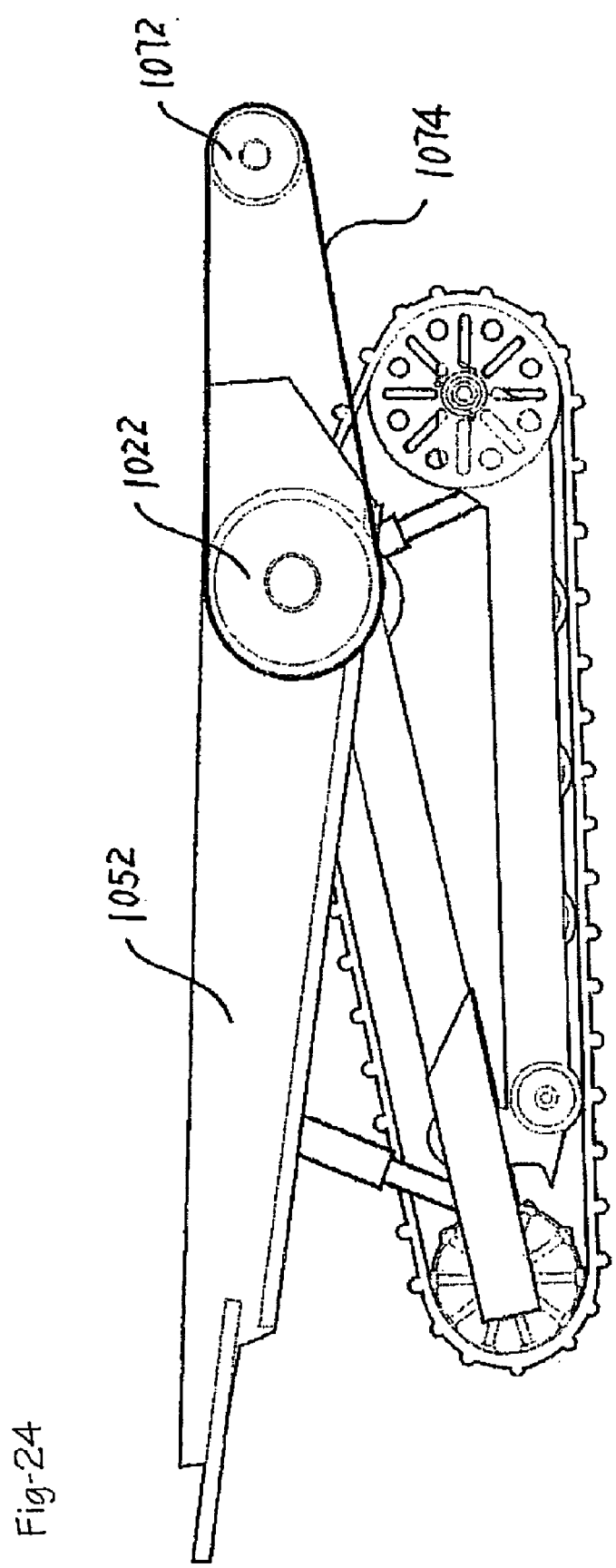
FIG. 24 is a side elevational schematic view of the snowmobile suspension and drive train shown in FIG. 16 together with the drive belt and pulleys together shown deployed onto a chassis of a snowmobile.

Referring now to FIG. 17, the snowmobile suspension and drive train 1000 is shown schematically in a top plan view together with the motor 1070 which drives a motor drive pulley 1072 which in turn drives a motor drive belt 1074 which in turn drives the motor driven pulley 1022 which in turn drives the front driven shaft 1018.

Brake system 1020 typically includes a brake rotor 1076 and a brake calliper 1078 of the type known in the art.

Front sprocket 1024 drives a chain 1080 which in turn transmits power back to the rear sprocket drive 1034 which in turn rotates rear drive shaft 1030 which in turn rotates drive track sprockets 1036 which transmit turning power to the track 1102 not shown in this Figure.

Referring now to FIGS. 18 and 19 snowmobile suspension and drive train 1000 in FIG. 19 is shown in the lowered position 1010 together with a track 1102 mounted thereon.

In the lowered position 1010 shown in FIGS. 18 and 19, top end 1028 of upper frame 1002 is lowered downwardly to the point where upper frame 1002 lies parallel and adjacent to lower frame 1004. In this position the bottom end 1032 is raised off of the ground 1101, thereby reducing the total contact length of the track 1102 as shown in FIGS. 18 and 19.

In particular, shown in FIG. 18 is the contact portions of track 1102 when the snowmobile suspension and drive train 1000 is in the lowered position 1010.

Track 1102 has a short contact length shown as S1110 when in the lowered position 1110 and also has a track lifted portion denoted as C1112 thereby reducing the total contact surface of track 1102 onto the ground 1101. The advantages of having a short contact length as denoted as 1110 will be discussed below.

Also will be noted in FIGS. 18 and 19 that the balance point of the entire snowmobile with no passengers aboard lies at approximately the position shown as BP namely 1114 which is known in the art as the balance point and the center of gravity lies at a point shown as CG 1301. The center of the front idler wheels 1052 are positioned within 6 inches either side of the balance point, and preferably within 2 inches of either side of the balance point, and preferably at the balance point meaning that some portion of front idler wheel lies over top of balance point BP 1114 of the sled.

Additionally shown in FIG. 19 is right frame rail 1014 of upper frame 1002. Right frame rail 1014 can be subdivided into the rear arm portion shown as A and denoted as 1120 and the front arm portion shown as B and denoted as 1122. Upper frame 1002 pivots about pivot shaft 1006 which subdivides right frame rail 1014 into the rear arm portion A1120 and the front arm portion B1122.

The reader will note that when the top end 1028 of right frame rail 1014 is raised thereby raising front arm portion 1122, the bottom end 1032 of right frame 1014 is lowered thereby lowering rear arm portion A1120.

Referring now to FIGS. 20 and 21, the snowmobile suspension and drive train shown generally as 1000 is shown in the raised position 1008. In the raised position, the total contact length is long contact length L denoted 1130 in FIG. 20 and the reader will note that the track lift portion denoted as C1112 now makes contact with the ground 1101. In the raised position 1008, the track area contacting the ground is maximized due to the extended long contact length L1130 achieved by lowering bottom end 1032 of upper frame 1002. The snowmobile chassis 1050 is shown in dashed lines in FIGS. 18 and 20 for illustrative purposes only to show schematically how the snowmobile suspension and drive train 1000 would be deployed relative to a chassis 1050.

Referring now to FIGS. 22 and 23, snowmobile suspension and drive train 1000 is shown deployed onto a snowmobile chassis 1050 shown in dashed lines. The diagram show front adjustable shocks 1200 and rear adjustable shocks 1202 which are connected to chassis 1050 and are of the type which can be raised and lowered. Therefore, one can select to lower the front adjustable shocks 1200 and/or the rear adjustable shocks 1202 and/or both thereby adjusting the ride, quality, height and as well affecting the total track contact length shown as L1130 and S1110 in FIGS. 18 and 20.

Figure 25:
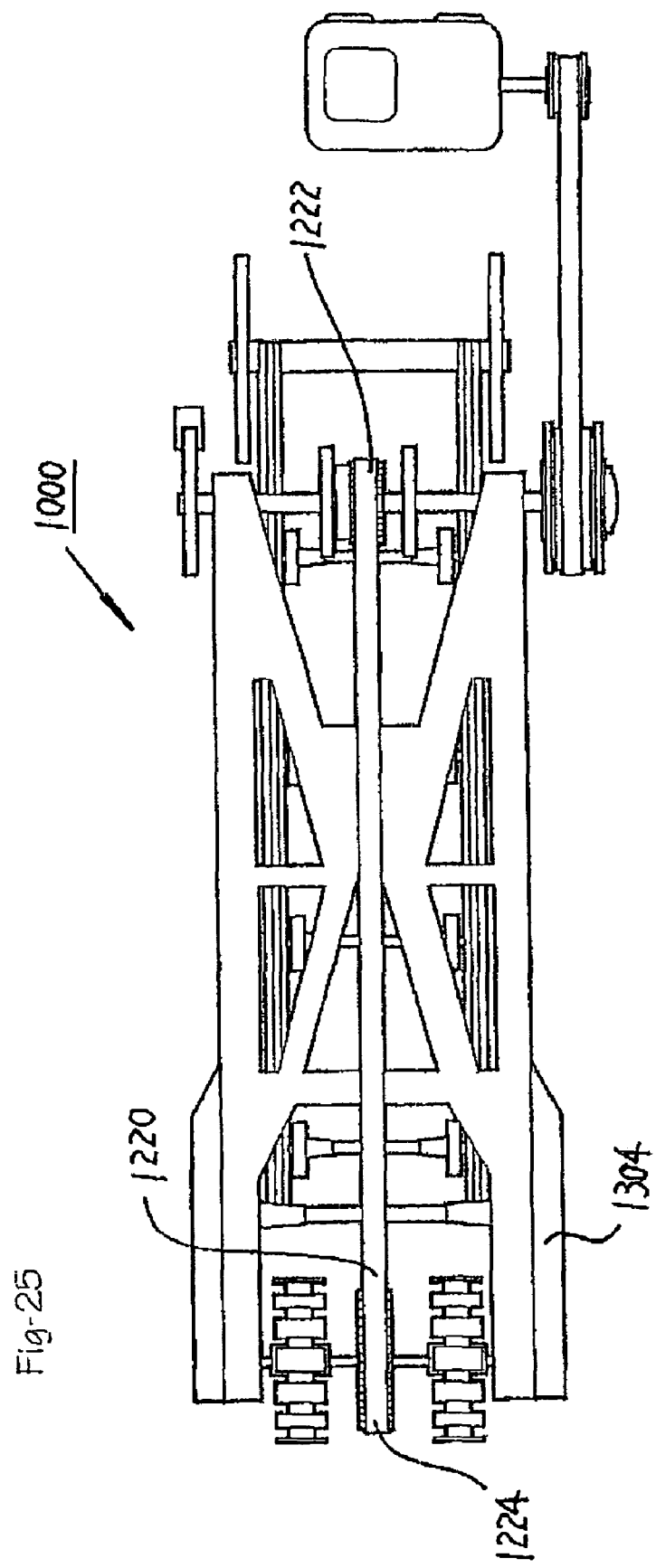
FIG. 25 is a top schematic plan view of the snowmobile suspension and drive train shown in FIG. 16 using a cog belt drive system to drive the rear drive sprockets rather than a chain.

FIG. 25 is a top schematic plan view of the snowmobile suspension and drive train 1000 similar to the view shown in FIG. 17, however in the case of FIG. 25 the chain 1080 is replaced with a cog belt 1220 and a person skilled in the art will note that rear sprocket drive 1034 and front sprocket 1024 would be exchanged with front cog 1222 and rear cog 1224 in order to transmit the drive forces from cog belt 1220 to the rear cog 1224. In all other respects, the snowmobile suspension and drive train 1000 shown in FIG. 25 is similar to the snowmobile suspension and drive train 1000 shown in FIG. 17.

Figure 26:
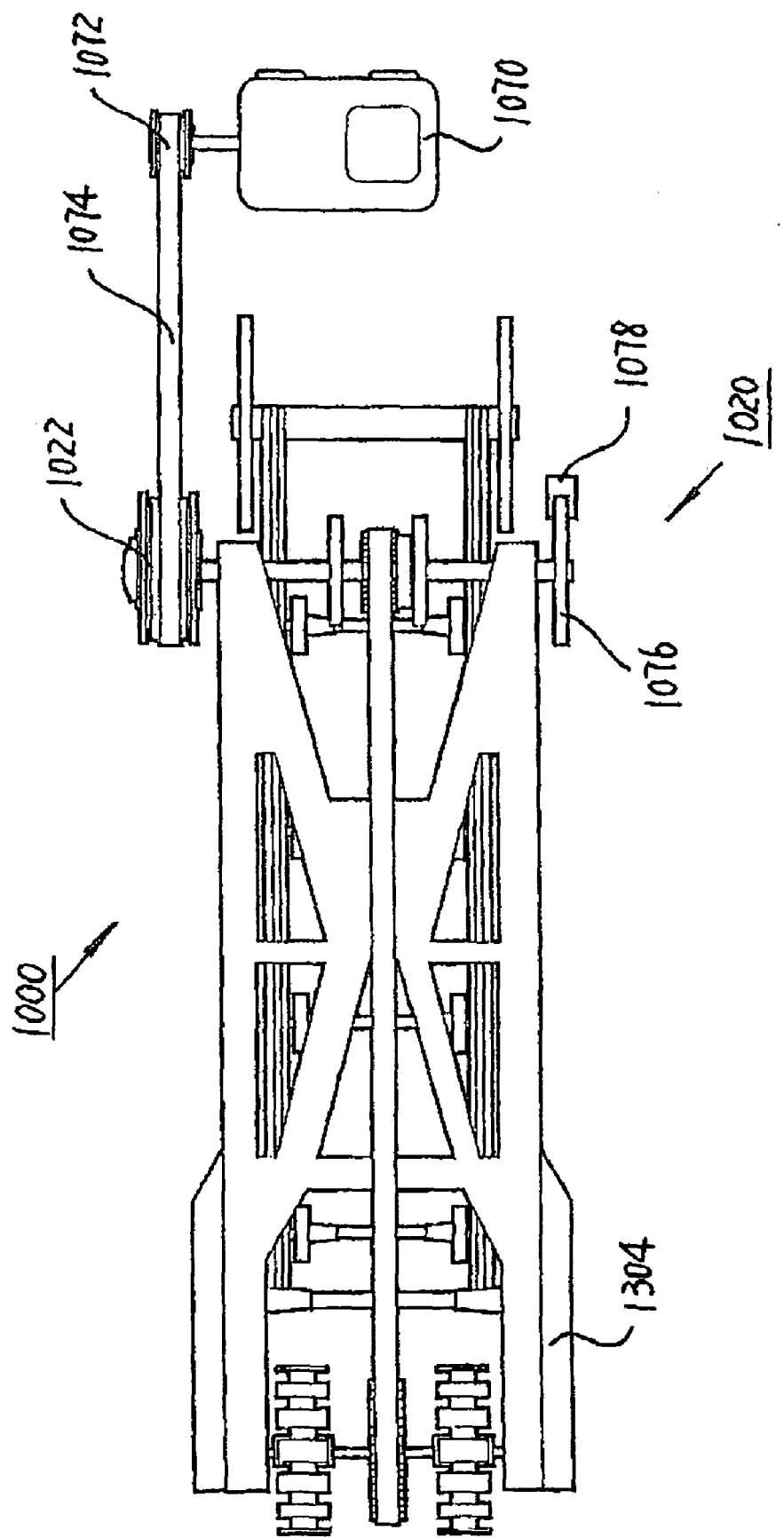
FIG. 26 is a top schematic plan view of the snowmobile suspension showing the engine drive line mounted on the other side of the suspension and drive train relative to FIGS. 25 and 17.

Referring now to FIG. 26, the reader will note that the snowmobile suspension and drive train shown generally as 1000 may have differently arranged drive trains. For example in FIG. 26 motor 1070, motor drive pulley 1072, motor drive belt 1074 and motor driven pulley 1022 are oriented on the left side rather than on the right side shown in FIGS. 17 and 25. It may be possible that the motor position may be found to be more convenient and/or efficient in another position than as shown in either FIG. 25 or 26 and this would still be part of the scope of the spirit of this snowmobile suspension and drive train.

In addition in FIG. 26 is shown sponsons 1304 which essentially is a snow floatation device mounted longitudinally along both sides of frame rails 1014 and 1016. Sponsons 1304 are used to add floatation in deep snow like a ski and help prevent the chances of getting stuck. The shape and size of the sponsons is optimized for different applications such as carving in deep snow, in which case one would want the sponsons to act like a ski or rudder. The sponsons may also be constructed larger to form a shroud in front of the track radius at the rear track position 1404 to prevent inside radius of the track from grabbing or hooking the snow up into the air as the snow enters inside of the track while travelling around the rear drive sprocket 1034 or rear idler wheels. This entrainment of snow may cause a certain amount of drag in deep snow and the sponsons 1034 can be shaped to reduce this drag. The sponson will also add protection to other suspension components and absorb impact during possible collision with objects.

Referring now to FIGS. 18 and 20, one will note that these figures also depict the center gravity 1301 as shown in the diagrams. The position of the center of gravity of the snowmobile relative to the orientation of the ladder bar frame 1012 will create certain reaction forces when under heavy acceleration and deceleration. It is preferable that the ladder bar frames 1012 instance center is pointing at or above the center of gravity 1301 in order to produce the optimal reaction forces.

Use of Snowmobile and Suspension Drive Train 1000

Reaction force is applied to ladder bar frame 1012 by means of torque applied via a chain 1080 and/or a cog belt 1220 to the rear drive sprocket 1034 or rear cog 1224. This creates a reaction force vector along the instant center of the ladder bar frame 1012. In the raised position for example a force vector runs along an imaginary line known as the instant center which passes through the pivot point 1007 and parallel to the frame rails 1014, 1016. This reaction force vector preferably passes above or intersects with the center of gravity 1301 when the suspension is in the raised position 1008. This reaction force vector dictates the behavior of the chassis movement relative to the center of gravity 1301. Torque applied at the rear drive shaft 1030 attempts to extend the suspension while weight transfer attempts to compress the suspension. Under operating conditions, the balance of these forces is created and the resulting forces increase pressure to the ground while having minimal affect on the front suspension (the pressure on the skis). Force vectoring is variable by controlling rear drive shaft 1030 torque and the position of the ladder bar frames 1012 instant center relative to the vehicle center of gravity 1301. For optimal performance one would like to have the ability to position the reaction force vector to pass above or intersect with the center of gravity 1301.

A conventional suspension and drive behaves in an opposite manner which is a disadvantage. Under heavy acceleration in a conventional suspension, the front suspension is unloaded and therefore, the ski pressure on the front skis decreases, making it more difficult to control the steering of the snowmobile. While carrying a passenger, these disadvantages of the conventional suspension become even more apparent.

By adjusting the height of rear adjustable shocks 1202 and front adjustable shocks 1200, one is able to independently adjust the front and/or rear height of snowmobile suspension drive train 1000. In FIG. 19 for example, the suspension is shown in the lowered position 1010, wherein the contact length of the track is at short contact length 1110. In FIG. 21 for example the snowmobile suspension and drive train 1000 is shown in the raised position 1008, wherein the contact of the track 1102 is the long contact length L shown as 1130. The length of the track 1102 contacting any surface such as ground 1101 is variable and can be extended and/or compressed depending upon whether the suspension is in the lowered position 1010 and/or the raised position 1008. In deep snow for example, increased surface area of the track 1102 is desired and therefore the suspension is put into the raised position 1008 which maximizes the contact length L 1130 and also raises the center of gravity of the snowmobile. This position is preferably for aggressive riding in deep snow and/or over rough terrain.

By adjusting the suspension to a lower ride height namely, putting in to lowered position 1010, one will improve the handling of the snowmobile by decreasing the surface area of track 1102 to the short contact length as 1110 and also lowering the center of gravity 1301. This permits tighter turning, reduces lateral weight transfer due to the lowering of center of gravity 1301 and improves turning capabilities and stability of the snowmobile. Therefore, suspension right height adjusts track geometry to compliment the intended purpose of the riding conditions.

Snowmobile suspension and drive train 1000 is essentially an endless loop track 1102 consisting of front idler wheels 1052 placed at the front track position 1402. The idler wheels are located directly below the snowmobile center of gravity 1301 and at the balance point 1114 of the snowmobile.

As indicated above by placing the suspension in lowered position 1110, one can reduce the track 1102 contact length and by raising the suspension into the raised position 1008, one can increase the track contact namely into long contact length L 1130.

The mechanical geometry of snowmobile suspension and drive train 1000 provides better performance under deceleration of the snowmobile. The inability of conventional snowmobiles to reduce speed and come to a complete stop is well known. Several factors are part of this undesirable behavior. The approach angle of a traditional snowmobile at the very first contact point of the track to the snow creates a ramp effect while braking. Snow accumulation in front of the track is compressed and forced to travel below the track. This causes a hydroplane type action, thereby reducing the ability of snowmobile to come to a fast halt.

Secondly, the track tension in a conventional drive created by the drive axle attempts to straighten and compress the suspension at the front of the track under deceleration conditions further inducing the ramp effect and further increasing the hydroplaning effect.

Thirdly, the initial contact of the track is almost 14 further back of the center of gravity 1301 as compared to the present snowmobile suspension and drive train 1000. A lower percentage of the total vehicle weight is applied to the track and is further amplified when weight is transferred forward during hard breaking onto the skis.

The present snowmobile suspension and drive train 1000, dramatically improves the ability to reduce speed, increase control and come to a fast stop. The following factors make this possible. The front idler wheels 1052 found in the forward portion of the track are almost directly under the vehicles center of gravity 1301 and directly under the snow machines balance point 1114. The center of gravity point 1301 of course changes depending upon the number of passengers that are riding on the snowmobile, but generally speaking, the center of gravity 1301 will move further back as additional passengers are added to the vehicle. This movement on the center of gravity position 1301 backward with the additional passengers, aids braking since a high percentage of the vehicles weight is applied to the front idler wheel 1052 under high breaking.

A third factor to increase traction under heavy breaking involves a direction of the forces applied to the front idler wheel 1052. The top track wheel 1026 applies force forwardly through the right and left frame members 1040 and 1042. Thereby transferring the energy and pivoting the ladder bar frame 1012. This effect causes further force to be applied to front idler wheel 1052 thereby reducing or preventing hydroplaning and causing idler wheel 1052 to dig in or assert more pressure onto ground 101. The front skis therefore remain firmly planted in the snow therefore maintaining steering control of vehicle and deceleration is greatly improved.

In addition, the distance between the motor drive pulley 1072 and the motor driven pulley 1022 is increased. This provides greater efficiency of the variable speed transmission since the area of contact around the primary clutch 1021 is increased, therefore reducing belt slippage, lowering heat created, increases belt life, increases reliability and effectively transfers power more efficiently to front driven shaft 1018. Manufacturing costs and assembly time are also reduced, due to less critical specifications for drive belt alignment due to the long drive center between the motor drive pulley 1072 and the motor driven pulley 1022. In addition, the chain case which is typically a part of the present day snowmobile drive trains is completely eliminated and therefore, less distance is required to transmit power to the ground.

The track tension is applied to approximately 40% of the track to transmit power to only the portion that contacts the ground, as the top side of the track essentially free wheels. This is because the rear drive shaft 1030 is the driven axle of the drive train. By applying the rotating or the torque to the rear portion of the track, one is essentially pulling track 1102 around front idler wheel 1052 and backwards around rear drive sprocket 1034, therefore applying tension along the bottom portion of track 1102 which is more or less in contact with the ground 101. This reduces track fatigue and proves rolling resistance around the large diameter front idler wheel 1052. The track can be operated quite loose with very little tension and without track skipping or ratcheting whether breaking or accelerating.

A convention sled applies tension to 90% of the track in order to transmit power to the ground. A conventional sled a large portion of the track is part of the transmission and in particular the top side of the track transmits power to the ground.

The reader will note that the front and rear track suspension can travel independently. In other words, front adjustable shock 1200 and rear adjustable shock 1202 can be independently raised and lowered and not coupled together as in a conventional suspension system. The present suspension can isolate the tuning, front or back and give considerable increase in rider comfort and control. In conventional suspensions, by adjusting either the front or back, it automatically affects other parts of the suspension.

The present invention applies chassis load through the through the ladder bar frame 1012 to the rear drive shaft 1030. Therefore, when a passenger is present on a snowmobile, they are sitting well ahead of the rear drive shaft 1030. The passenger's weight does proportionally add weight to the front skis which is need to maintain control of the snowmobile.

This is not the case in conventional snowmobiles, wherein the front skis are unloaded with the presence of passengers onto the back of the snowmobile.

The present design is very versatile in that the user has the capability to adjust ride height while stationary or under motion. It is possible to have the entire weight of the vehicle placed on the front idler wheels 1052 which allows the operator to easily pivot the snowmobile around balancing only on the front idler wheel 1052. A 500 pound sled under these conditions requires only 20 pounds of pull at a rear grab handle located near the rear drive sprocket 1034 in order to turn the sled totally around on dry pavement, or hard packed snow by positioning the entire weight of the snowmobile over front idler wheel 1052. Small children and the elderly with back trouble and people who are unable to bend and push and/or pull to a great degree can easily completely pivot the snowmobile around the front idler wheels 1052 by simply positioning the suspension in such a manner that the majority of weight is concentrated over the front idler wheel 1052.

The same capability while riding the vehicle, allows the operator to raise the skis off the ground to cross the road or surface that may cause damage to the front ski carbide runners and also to public property.

The same capability also gives the operator the choice to adjust the ski pressure downwards while operating the snowmobile. This is desirable for different operating conditions which change the handling characteristics and the bands of the snowmobile. For instance if you are carrying a heavy load or a passenger, you may choose to raise the rear end in order to level out the vehicle. In deep snow you may choose to have little or no ski pressure to make the snowmobile nibble and easy to carve by only shifting your weight.

In addition to this the present design reduces manufacturing costs, assembly time, it simplifies and reduces the number of parts. The method used to manufacture may be less costly and in particular maintenance procedures may also be less time consuming.

Figure 27:
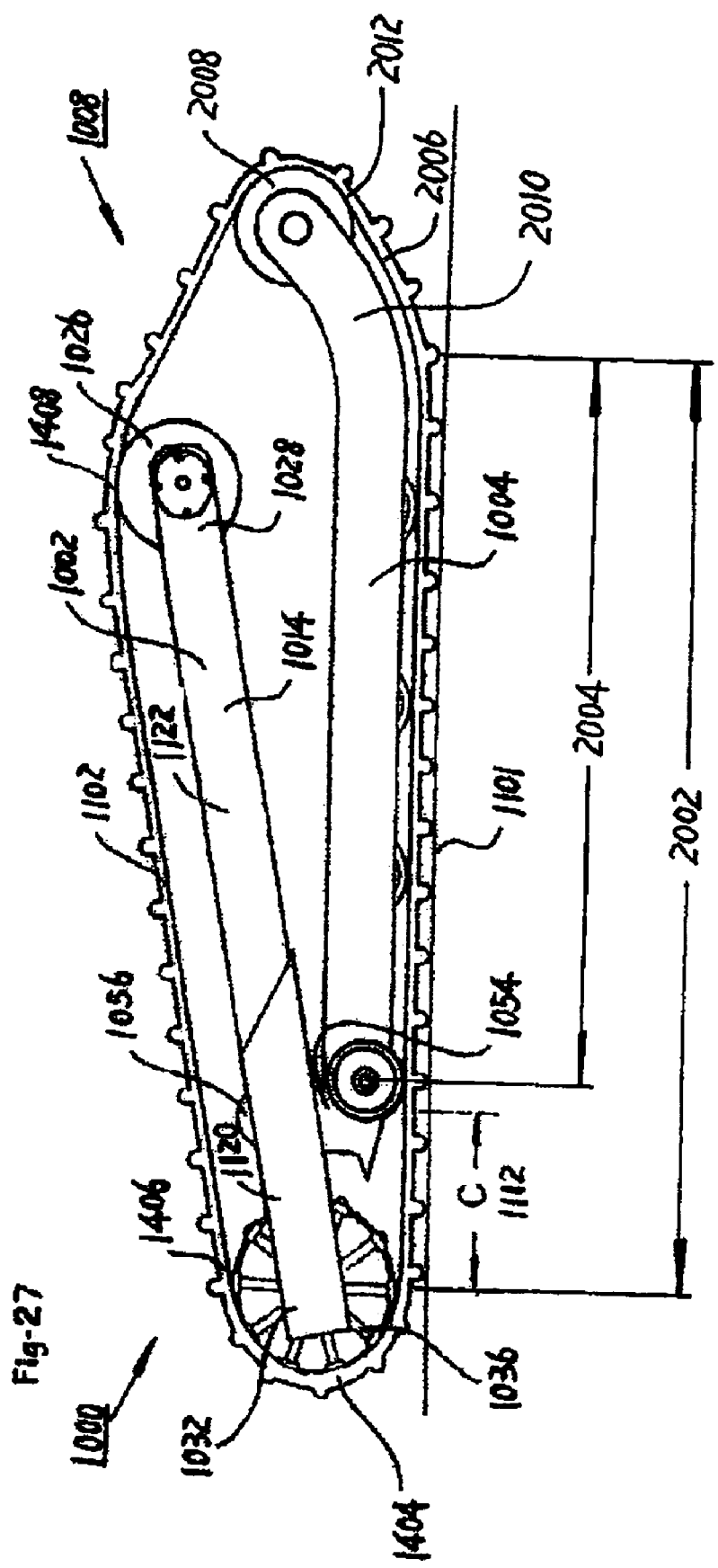
FIG. 27 is a side elevational schematic side view of an alternate arrangement of the snowmobile suspension and drive train in the raised position depicting an inclined approach.

Referring now to FIG. 27 which shows an alternate suspension set up with an inclined approach 2006 proximate front track portion 2012. Lower frame 1004 includes an upwardly curved forward end 2010 thereby creating an inclined approach 2006 to track 1102. The short contact length 2004 and the long contact length 2002 are modified respectively relative to the previous embodiment due to the inclined approach 2006 as depicted in FIG. 27.

It should be apparent to persons skilled in the arts that various modifications and adaptation of this structure described above are possible without departure from the spirit of the invention the scope of which defined in the appended claim.

I claim:

1. A snowmobile suspension for supporting a snowmobile chassis and for guiding and supporting an endless loop type track, the snowmobile suspension comprising:
   a) an endless loop type snowmobile track supported by a suspension;
   b) the suspension including a frame housed within the endless loop track,
   c) the suspension further including a guide means for guiding the track around the suspension;
   d) wherein the frame includes an upper frame pivotally connected at a pivot point to a horizontally oriented lower frame housed within the endless loop track in scissor relationship, such that the suspension movable between a raised position and a lowered position;
   e) wherein the guide means including top track wheels mounted at a top end of the upper frame and track drive sprockets mounted at a bottom end of the upper frame for guiding the track around the suspension.

2. The snowmobile suspension claimed in claim 1 wherein the guide means including front idler wheels operably mounted to the lower frame at a front track position.

3. The snowmobile suspension claimed in claim 2 wherein the lower frame oriented such that at the front track position the track begins to make contact with the ground under the front idler wheels.

4. The snowmobile suspension claimed in claim 2 wherein the lower frame including an upwardly curved forward end such that at the front track portion the track is at an inclined approach relative to the ground.

5. The snowmobile suspension claimed in claim 1 wherein the top track wheels located at the track intermediate position for guiding a track upper portion around the suspension.

6. The snowmobile suspension claimed in claim 1, wherein in the lowered position the upper frame is oriented substantially parallel to the lower frame such that a track lifted off portion is lifted off the ground at the rear track position.

7. The snowmobile suspension claimed in claim 1 wherein in the raised position the upper frame is oriented such that it extends diagonally relative to the lower frame, such that at the rear track position the track breaks contact with the ground under the track drive sprockets.

8. The snowmobile suspension claimed in claim 1 wherein the lower frame connected at a pivot point at a rear end of the lower frame and including front idlers wheels mounted at an idler end of the lower frame.

9. A snowmobile suspension for supporting snowmobile chassis and for guiding and supporting an endless loop type track, the snowmobile suspension comprising:
   a) an endless loop type snowmobile track supported by a suspension;
   b) the suspension including a frame housed within the endless loop track,
   c) the suspension further including a guide means for guiding the track around the suspension;
   d) wherein the frame includes an upper frame pivotally connected at a pivot point to a horizontally oriented lower frame housed within the endless loop track in scissor relationship, such that the suspension movable between a raised position and a lowered position;
   e) wherein the pivot point dividing the upper frame into a rear arm portion on one side of the pivot point and a front arm portion on the other side of the pivot point.

10. The snowmobile suspension and drive train claimed in claim 9 wherein in the raised position the rear arm portion urging the track drive sprockets and the track there beneath onto the ground such that a track long contact length being the portion contacting the ground.

11. The snowmobile suspension claimed in claim 9 wherein in the lowered position the rear arm portion urging the track drive sprockets and the track there beneath off of the ground resulting in a track short contact length being the portion contacting the ground.

12. The snowmobile suspension claimed in claim 1 wherein in the raised position a reaction force vector intersecting the pivot point and parallel to the upper frame will intersect with a center of gravity of the entire vehicle.

13. The snowmobile suspension claimed in claim 1 wherein in the raised position a reaction force vector passing through the pivot point and parallel to the upper frame will pass above a center of gravity of the entire vehicle.

14. The snowmobile suspension claimed in claim 1 wherein the lower frame including left and right frame members having mounted thereon track wheels for supporting the track rollably thereon.

15. The snowmobile suspension claimed in claim 14 wherein the frame members including a pivot flange projecting upwardly from a rear end of each frame member forming L shaped left and right frame members such that the pivot point is located on the pivot flange.

16. The snowmobile suspension claimed in claim 1 wherein the frame is suspended to the chassis with a front biasing means and a rear biasing means such that the track at the front track position and the track at the rear track position can be adjusted up and down independently of each other.

17. The snowmobile suspension claimed in claim 16 wherein the front biasing means includes front adjustable shocks and the rear biasing means includes rear adjustable shocks.

18. A snowmobile suspension for supporting a snowmobile chassis and for guiding and supporting an endless loop type track, the snowmobile suspension comprising:

a) an endless loop type snowmobile track supported by a suspension;
b) the suspension including a frame housed within the endless loop track,
c) the suspension further including a guide means for guiding the track around the suspension;
d) wherein the frame includes an frame pivotally connected at a pivot point to a horizontally oriented lower frame housed within the endless loop track in scissor relationship, such that the suspension movable between a raised position and a lowered position;
e) wherein the frame is fastened to the chassis with two front adjustable shocks to the idler end of the lower frame and two rear adjustable shocks at the bottom end of upper frame such that the track at the front track position and the track at the rear track position can be adjusted up and down relative to a chassis and independently of each other.

* * * * *